United States Patent [19]
Matyas

[11] Patent Number: 5,231,666
[45] Date of Patent: Jul. 27, 1993

[54] CRYPTOGRAPHIC METHOD FOR UPDATING FINANCIAL RECORDS

[75] Inventor: Stephen M. Matyas, Manassas, Va.

[73] Assignee: International Business Machines Corporation, Armonk, N.Y.

[21] Appl. No.: 870,978

[22] Filed: Apr. 20, 1992

[51] Int. Cl.$^5$ .............................................. H04K 1/00
[52] U.S. Cl. ...................................... 380/25; 380/23; 380/4
[58] Field of Search .............................. 380/23, 25, 4

[56] References Cited

U.S. PATENT DOCUMENTS

| | | |
|---|---|---|
| 4,309,569 | 1/1982 | Merkle . |
| 4,661,658 | 4/1987 | Matyas . |
| 4,850,177 | 7/1989 | Brachtl et al. . |
| 4,908,861 | 3/1990 | Brachtl et al. . |
| 4,918,728 | 4/1990 | Matyas et al. . |
| 4,924,514 | 5/1990 | Matyas et al. . |
| 4,924,515 | 5/1990 | Matyas et al. . |
| 4,941,176 | 7/1990 | Matyas et al. . |
| 4,993,069 | 2/1991 | Matyas et al. . |
| 5,007,089 | 4/1991 | Matyas et al. . |
| 5,103,478 | 4/1992 | Matyas et al. . |

OTHER PUBLICATIONS

R. C. Merkle, "Secrecy, Authentication, and Public Key Systems," UMI Research Press, Ann Arbor, Mich., 1982 & Technical Report, No. 1979-1, Information Systems Laboratory, Stanford University, Jun. 1979.

R. C. Merkle, "Protocols for Public Key Cryptosystems," Technical Report, BNR, Palo Alto, Calif., Jan. 1980.

R. C. Merkle, "Protocols for Public Key Cryptosystems," Proceedings of the 1980 Symposium on Securty and Privacy, pp. 122-134, Apr. 14-16, 1980.

Primary Examiner—David Cain
Attorney, Agent, or Firm—John E. Hoel

[57] ABSTRACT

A data processing system, method and computer program provide for the secure updating an electronic purse which includes a list of purse records. The method includes the step of defining an authentication tree with an authentication tree function comprising a one way function of purse records in the list, the authentication tree having a first root for a first list of the purse records and storing the first root in a cryptographic facility. The authentication tree includes authentication MDC vectors, one for each purse record in the list. The method includes the step of receiving a transaction record in the cryptographic facility, including an authentication code, a cryptographic key, and an authentication MDC vector, for updating an existing purse record in the first list. The method then performs the step of performing a purse update function in the cryptographic facility. The method first authenticates the transaction record using the authentication code and cryptographic key and authenticates the existing purse record with the authentication MDC vector and first root. The method next performs the step of substituting an updated purse record for the existing purse record in the first list, forming a second list. The method then computes with the updated purse record and the first authentication MDC vector, a second path MDC vector and a second root of the authentication tree for the second list by computing a path MDC vector of the authentication tree between the updated purse record and the first root and stores the second root in the cryptographic facility.

2 Claims, 6 Drawing Sheets

BINARY TREE:

CRYPTOGRAPHIC NETWORK:

FIG. 6

INDEXES IN RF AND MDCV:

| RF | MDCV |
|----|------|
| 1  | 16   |
| 2  | 17   |
| 3  | 18   |
| 4  | 19   |
| 5  | 20   |
| 6  | 21   |
| 7  | 22   |
| 8  | 23   |
| 9  | 24   |
| 10 | 25   |
| 11 | 26   |
| 12 | 27   |
| 13 | 28   |
| 14 | 29   |
| 15 | 30   |
| 16 | 31   |

FIG. 8

TRANSACTION MESSAGE ORIGINATING WITH MEMBER i :

| ACCOUNT NUMBER DEBITED (i) | ACCOUNT NUMBER CREDITED (j) | AMOUNT | TRANSACTION SEQUENCE NUMBER | ... OTHER ... |
|---|---|---|---|---|

FIG. 9

PURSE RECORD $R_i$ :

| FINANCIAL INSTITUTION ACCOUNT NUMBER (i) | ACCOUNT BALANCE | TRANSACTION SEQUENCE NUMBER | ... OTHER ... |
|---|---|---|---|

CRYPTOGRAPHIC SYSTEM COMPONENTS TO IMPLEMENT THE TREE AUTHENTICATION ALGORITHM:

* THESE ROUTINES COULD ALSO BE IMPLEMENTED AS CF INSTRUCTIONS, SINCE THEY ALREADY EXIST AS INTERNAL ROUTINES WITHIN THE CF.
** THE GMDC INSTRUCTION IS AN EXAMPLE OF AN INTERNAL ROUTINE EXTERNALIZED AS A CF INSTRUCTION.

CRYPTOGRAPHIC SYSTEM (BLOCK DIAGRAM):

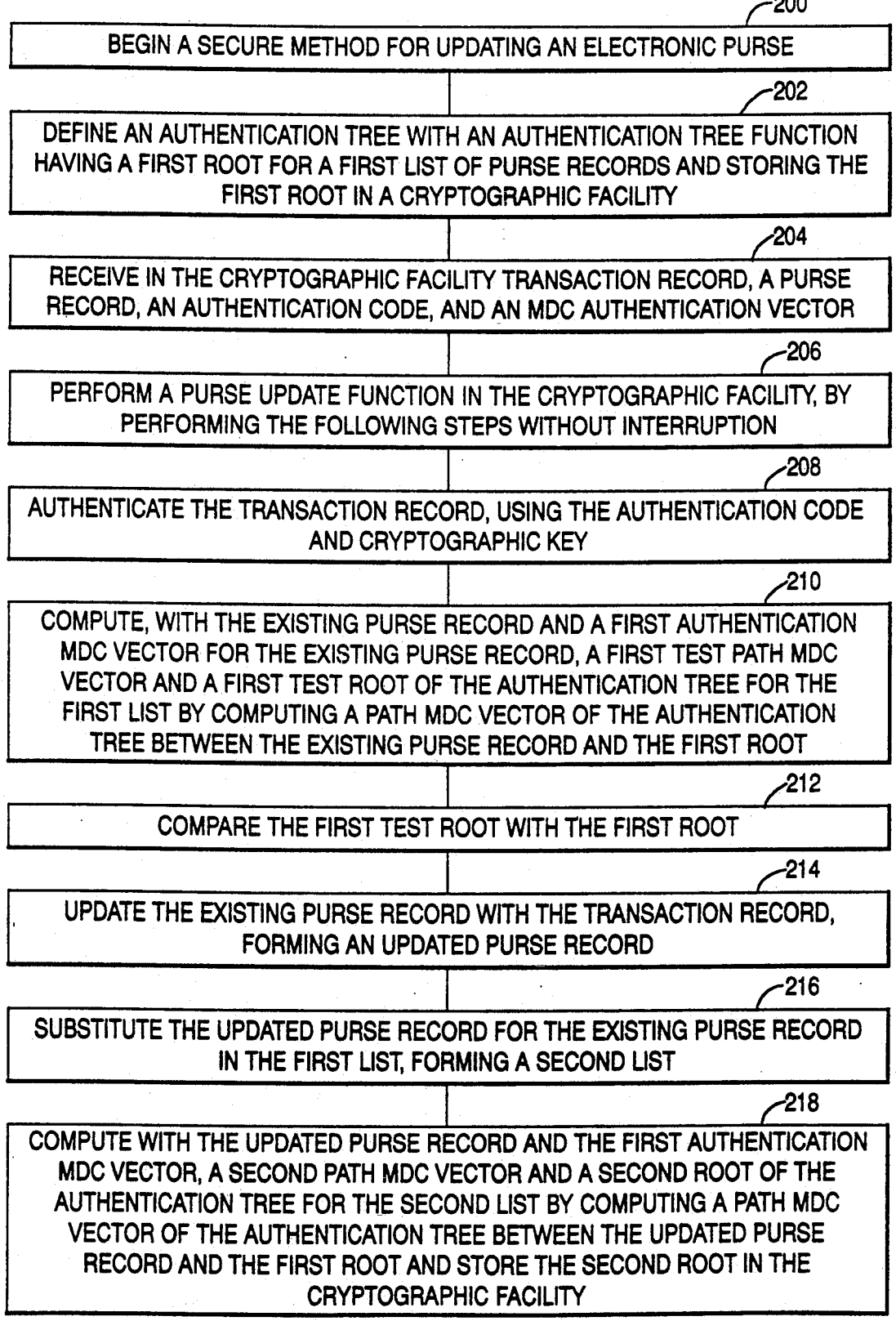

CRYPTOGRAPHIC METHOD FOR UPDATING FINANCIAL RECORDS

BACKGROUND OF THE INVENTION

1. Technical Field

The invention disclosed broadly relates to data processing systems and methods and more particularly relates to cryptographic systems and methods for use in data processing systems to enhance security.

2. Background Art

The following patents and patent applications are related to this invention and are incorporated herein by reference:

R. C. Merkle, "Method of Providing Digital Signatures," U.S. Pat. No. 4,309,569, issued Jan. 5, 1982.

R. C. Merkle, *Secrecy, Authentication, and Public Key Systems*, UMI Research Press, Ann Arbor, Mich., 1982.

R. C. Merkle, *Secrecy, Authentication, and Public Key Systems*, Technical Report No. 1979-1, Information Systems Laboratory, Stanford University, June 1979.

R. C. Merkle, *Protocols for Public Key Cryptosystems*, Technical Report, BNR, Palo Alto, Calif., January 1980.

R. C. Merkle, "Protocols for Public Key Cryptosystems," *Proceedings of the 1980 Symposium on Security and Privacy*, 122-134, Apr. 14-16, 1980.

S. M. Matyas, "Offline PIN Validation with DES," U.S. Pat. No. 4,661,658, issued Apr. 28, 1987, assigned to IBM Corporation and incorporated herein by reference.

B. Brachtl, et al., "Controlled Use of Cryptographic Keys Via Generating Stations Established Control Values," U.S. Pat. No. 4,850,017, issued Jul. 18, 1989, assigned to IBM Corporation and incorporated herein by reference.

S. M. Matyas, et al., "Secure Management of Keys Using Control Vectors," U.S. Pat. No. 4,941,176, issued Jul. 10, 1990, assigned to IBM Corporation and incorporated herein by reference.

S. M. Matyas, et al., "Data Cryptography Operations Using Control Vectors," U.S. Pat. No. 4,918,728, issued Apr. 17, 1990, assigned to IBM Corporation and incorporated herein by reference.

S. M. Matyas, et al., "Personal Identification Number Processing Using Control Vectors," U.S. Pat. No. 4,924,514, issued May 8, 1990, assigned to IBM Corporation and incorporated herein by reference.

S. M. Matyas, et al., "Secure Management of Keys Using Extended Control Vectors," U.S. Pat. No. 4,924,515, issued May 8, 1990, assigned to IBM Corporation and incorporated herein by reference.

S. M. Matyas, et al., "Secure Key Management Using Control Vector Translation," U.S. Pat. No. 4,993,069, issued Feb. 12, 1991, assigned to IBM Corporation and incorporated herein by reference.

S. M. Matyas, et al., "Secure Key Management Using Programmable Control Vector Checking," U.S. Pat. No. 5,007,089, issued Apr. 9, 1991, assigned to IBM Corporation and incorporated herein by reference.

S. M. Matyas, et al., "Secure Management of Keys Using Control Vectors with Multi-Path Checking," Ser. No. 07/596,637, filed Oct. 12, 1990, assigned to IBM Corporation and incorporated here by reference.

S. M. Matyas, et al., "Secure Cryptographic Operations Using Alternate Modes of Control Vector Enforcement," Ser. No. 07/574,012, filed Aug. 22, 1990, assigned to IBM Corporation and incorporated here by reference.

B. Brachtl, et al., "Data Authentication Using Modification Detection Codes Based on a Public One Way Encryption Function," U.S. Pat. No. 4,908,861, issued Mar. 13, 1990, assigned to IBM Corporation and incorporated herein by reference.

S. M. Matyas, et al., "Method and Apparatus for Controlling the Use of a Public Key, Based on the Level of Import Integrity for the Key," Ser. No. 07/602,989, filed Oct. 24, 1990, assigned to IBM Corporation and incorporated herein by reference.

S. M. Matyas, et al., "A Hybrid Public Key Algorithm/Data Encryption Algorithm Key Distribution Method Based on Control Vectors," Ser. No. 07/748,407, filed Aug. 22, 1991, assigned to IBM Corporation and incorporated herein by reference.

S. M. Matyas et al., "Generating Public and Private Key Pairs Using a Passphrase," Ser. No. 07/766,533, filed Sep. 27, 1991, assigned to IBM Corporation and incorporated herein by reference.

S. M. Matyas et al., "Public Key Cryptosystem Key Management Based on Control Vectors," Ser. No. 07/766,260, filed Sep. 27, 1991, assigned to IBM Corporation and incorporated herein by reference.

S. M. Matyas et al., "Method to Establish and Enforce a Network Cryptographic Security Policy in a Public Key Cryptosystem," Ser. No. 07/786,227, filed Oct. 31, 1991, assigned to IBM Corporation and incorporated herein by reference.

S. M. Matyas et al., "Cryptographic Facility Environment Backup/Restore and Replication in a Public Key Cryptosystem," Ser. No. 07/786,237, filed Oct. 31, 1991, assigned to IBM Corporation and incorporated herein by reference.

The cryptographic architecture described in U.S. Pat. Nos. 4,850,017, 4,941,176, 4,918,728, 4,924,514, 4,924,515, 4,993,069, and 5,007,089 and in patent applications Ser. No. 07/596,637, Ser. No. 07/574,012, Ser. No. 07/602,989, Ser. No. 07/748,407, Ser. No. 07/766,533, Ser. No. 07/766,260, Ser. No. 07/786,227, and Ser. No. 07/786,237 by S. M. Matyas et al. is based on associating with a cryptographic key, a control vector which provides the authorization for the uses of the key intended by the originator of the key. The cryptographic architecture described in the cited U.S. Pat. Nos. 4,850,017, 4,941,176, 4,918,728, 4,924,514, 4,924,515, 4,993,069, and 5,007,089 and cited patent applications Ser. No. 07/596,637 and Ser. No. 07/574,012 by S. M. Matyas et al. is based on the Data Encryption Algorithm (DEA), see American National Standard X3.92-1981, *Data Encryption Algorithm*, American National Standards Institute, New York Dec. 31, 1981). The cryptographic architecture described in the cited patent applications Ser. No. 07/602,989, Ser. No. 07/748,407, Ser. No. 07/766,533, Ser. No. 07/766,260, Ser. No. 07/786,227, and Ser. No. 07/786,237, by S. M. Matyas et al. is based in addition on a public key algorithm (PKA), i.e., a combination of DEA and PKA. A cryptographic facility (CF) in the cryptographic architecture is described in the above cited patents by S. M. Matyas, et al. The CF is an instruction processor for a set of cryptographic instructions, implementing encryption methods and key generation methods. A memory in the cryptographic facility stores a set of internal cryptographic variables. Each cryptographic instruction is described in terms of a sequence of processing steps required to transform a set of input parameters to a set of output parameters. A cryptographic facility application program (CFAP) is also described in the referenced patents and patent applications, which defines an invocation method, as a calling sequence, for each cryptographic instruction consisting of an instruction mnemonic and an address with corresponding input and output parameters.

Public key encryption algorithms are described in a paper by W. Diffie and M. E. Hellman entitled "Privacy and Authentication: An Introduction to Cryptography," *Proceedings of the IEEE*, Volume 67, No. 3, March 1979, pp. 397-427. Public key systems are based on dispensing with the secret key distribution channel, as long as the channel has a sufficient level of integrity. In a public key cryptographic system, two keys are used, one for enciphering and one for deciphering. Public key algorithm systems are designed so that it is easy to generate a random pair of inverse keys PU for enciphering and PR for deciphering and it is easy to operate with PU and PR, but is computationally infeasible to compute PR from PU. Each user generates a pair of inverse transforms, PU and PR. He keeps the deciphering transformation PR secret, and makes the enciphering transformation PU public by placing it in a public directory. Anyone can now encrypt messages and send them to the user, but no one else can decipher messages intended for him. It is possible, and often desirable, to encipher with PU and decipher with PR. For this reason, PU is usually referred to as a public key and PR is usually referred to as a private key.

A feature of public key cryptographic systems is the provision of a digital signature which uniquely identifies the sender of a message. If user A wishes to send a signed message M to user B, he operates on it with his private key PR to produce the signed message S. PR was used as A's deciphering key when privacy was desired, but it is now used as his "enciphering" key. When user B receives the message S, he can recover the message M by operating on the ciphertext S with A's public PU. By successfully decrypting A's message, the receiver B has conclusive proof it came from the sender A. Digital signatures can be produced either by decrypting the data to be signed with the private key, which works well when the data is short, or by first hashing the data with a strong one-way cryptographic function and decrypting the so-produced hashed value with the private key. Either method will work. Thus, in the above described method of DEA key distribution, B sends A two quantities: (1) the encrypted key, ePU(K), and (2) a digital signature e.g., of the form (a) dPR(ePU(K)) or dPR(hash(ePU(K))). A method for producing digital signatures based on the hash of the data to be signed is taught in co-pending patent application Ser. No. 07/748,407 ("A Hybrid Public Key Algorithm/Data Encryption Algorithm Key Distribution Method Based on Control Vectors"), cited in the Background Art. Examples of public key cryptography are provided in the following U.S. patents: U.S. Pat. No. 4,218,582 to Hellman, et al., "Public Key Cryptographic Apparatus and Method;" U.S. Pat. No. 4,200,770 to Hellman, et al., "Cryptographic Apparatus and Method;" and U.S. Pat. No. 4,405,829 to Rivest, et al., "Cryptographic Communications System and Method."

U.S. Pat. No. 4,309,569 to Merkle for "Method of Providing Digital Signatures" discloses a method of providing a digital signature for purposes of authentication of a message. This method utilizes an authentication tree function or a one-way function of a secret number. More specifically, the method according to Merkle provides a digital signature of the type which generates a secret number $X_i$, where $X_i = x_{i1}, x_{i2}, \ldots, x_{in}$ computes $Y_i = F(X_i)$ and transmits part of $X_i$ to the receiver as the digital signature. Merkle characterizes his invention as providing an authentication tree with an authentication tree function comprising a one-way functions of $Y_i$. The root of the authentication tree and the authentication tree function are authenticated at the receiver. The $Y_i$ and the corresponding authentication path values of the authentication tree are transmitted from the transmitter to the receiver. Finally, the $Y_i$ are authenticated at the receiver by computing the authentication path of the authentication tree between the $Y_i$ and the rest of the authentication tree. U.S. Pat. No. 4,661,658 to Matyas for "Offline PIN Validtion with DES" discloses a method of offline personal authentication in a multiterminal system. The method makes use of a secret user PIN, a secret key and other nonsecret data stored on a customer memory card, and a nonsecret validation value and stored in each terminal connected in a network. The nonsecret validation value is just the root of an authentication tree calculated using a Merkle tree authentication function. In each case, U.S. Pat. No. 4,309,569 to Merkle and U.S. Pat. No. 4,661,658 to Matyas, the described inventions make use of a root of an authentication tree calculated on data characterized as a piece of information in a list of information or one item in a list of items that remain constant. Neither U.S. Pat. No. 4,309,569 to Merkle and U.S. Pat. No. 4,661,658 to Matyas teach how a tree authentication algorithm can be used to authenticate data in a dynamically and rapidly changing data file. In effect, U.S. Pat. No. 4,309,569 to Merkle and U.S. Pat. No. 4,661,658 to Matyas make use of a root of an authentication tree calculated on a list of information or items that remain constant, and hence these inventions are characterized by a root of an authentication tree that remains constant. However, there are data processing environments wherein it is desired to authenticate data elements in a data file that is continually updated and changed. Such processing environments are common in transaction based systems, where each processed transaction may cause a central data file to be updated. The present invention described a method for adapting the Merkle tree authentication algorithm so that it may be applied advantageously to solve the problem of authenticating data elements in a dynamically changing data file.

The subject invention describes a cryptographic method for implementing a particular kind of data file called an electronic purse. An electronic purse is a computer data file consisting of the account records of a group of member financial institutions. The member institutions communicate with the purse, located at a central facility, via an Electronic Funds Transfer network. Each purse record contains a member financial institution identifier, an account balance, a transaction sequence number, and other appropriate data not relevant to the present discussion. Account balances can range in the millions and billions of dollars. Hence, the integrity of the purse, and particularly the transaction-driven process of updating the purse, is of critical importance. The integrity of the purse is achieved through use of a tree authentication algorithm. The tree authentication algorithm makes use of modification detection codes calculated with a public one-way cryptographic function.

Since the purse may contain many records, it is impractical for these records to be stored within the secure boundary of a cryptographic facility (i.e., cryptographic hardware). However, when purse records are stored outside the CF, they are exposed to possible change or replacement by an insider adversary. Thus, a method is needed to preserve the integrity of the purse, i.e., an equivalent level of integrity should be achieved. For a purse with records R1, R2, . . . , Rn, the security objectives are these:

1. The CF must permit records in the purse to be authenticated independently. That is, the CF can authenticate record Ri without having access to other records in the purse.
2. The CF must permit purse records to be updated without loss of integrity to the purse. Thus, if Ri' is an updated record produced from record Ri, the CF must recognize Ri' as a valid record and Ri as an invalid record.
3. The CF must permit records in the purse to be updated independently. That is, the CF can update record Ri without having access to other records in the purse.

The security objectives preclude straightforward, or obvious authentication schemes based on message authentication codes calculated with the Data Encryption Algorithm or digital signatures calculated with a public key algorithm (e.g., using the RSA algorithm). To illustrate this, suppose the KD is a clear key, in the cryptographic facility, used to generate and verify message authentication codes. Suppose that the electronic purse consists of entries (R1, MAC1), (R2, MAC2), . . . , (Rn, MACn), where each record Ri has an associated MACi generated on Ri using the key KD. Each (Ri, MACi) is easily validated in the cryptographic facility using KD. But there is no effective way to update purse records using the straightforward method of calculating a new MAC on an updated record. This is so because the process of replacing purse record (Ri, MACi) with updated purse record (Ri', MACi') does not invalidate (Ri, MACi). Thus, an insider adversary with access to the purse and an old copy of (Ri, MACi) may subvert the purse by substituting (Ri, MACi) in place of (Ri', MACi'). The problem is not remedied by changing KD, since then MACs must be recalculated on all the purse records. This could be costly for large files.

The same problem occurs if digital signatures are used instead of message authentication codes, since changing the public and private key pair each time a record in the file is changed will likewise require the signature for record in the file to be re-calculated. This no advantage is gained from a public key algorithm over a private or secret key algorithm.

OBJECTS OF THE INVENTION

It is therefore an object of the invention to provide an improved method of file management in a data processing system.

It is another object of the invention to provide a means for authenticating records in a file of records, or an item in a list of items, or a piece of information in a list of information.

It is another object of the invention to provide a means of authentication such that the authentication method depends on the record, item, or piece of information being authenticated, and a root of an authentication tree calculated on the file of records or list of items or list of information, but is independent of other records in the file or other items in the list of items or other information in the list of information and does not require this information or any part thereof to be input to the authentication algorithm in order to authenticate the specified record, item, or piece of information.

It is another object of the invention to provide a means of authentication such that the root of the authentication tree can be updated dynamically and in a secure way whenever a record in the file of records or item in the list of items or piece of information in the list of information changes.

It is another object of the invention to provide a means to dynamically update the root of the authentication tree and the authentication tree itself such that the process of updating the root and the authentication tree depends on the record, item, or piece of information being changed and a relatively small set of pre-calculated values from the authentication tree (roughly log2(n) values where n is the number of records in the file or items in the list or pieces of information in the list), but is independent of other records in the file or other items in the list of items or other information in the list of information and does not require these other records, items, or information, or any part thereof to be input to the update procedure.

It is another object of the invention to provide an authentication means and update means such that as records, items, or information is updated that the new records, items, or information are recognized by the authentication method as genuine whereas the old records, items, or information, are recognized by the authentication method as not genuine.

SUMMARY OF THE INVENTION

These and other objects, features, and advantages are accomplished by the invention disclosed herein.

A data processing system, method and computer program provide for the secure updating an electronic purse which includes a list of purse records. The method includes the step of defining an authentication tree with an authentication tree function comprising a one-way function of purse records in the list, the authentication tree having a first root for a first list of the purse records and storing the first root in a cryptographic facility. The authentication tree includes authentication MDC vectors, one for each purse record in the list. The method includes the step of receiving a transaction record in the cryptographic facility, including an authentication code, a cryptographic key, and an authentication MDC vector, for updating an existing purse record in the first list. The method then performs the step of performing a purse update function in the cryptographic facility. The method first authenticates the transaction record using the authentication code and cryptographic key and authenticates the existing purse record with the authentication MDC vector and first root. The method next performs the step of substituting an updated purse record for the existing purse record in the first list, forming a second list. The method then computes with the updated purse record and the first authentication MDC vector, a second path MDC vector and a second root of the authentication tree for the second list by computing a path MDC vector of the authentication tree between the updated purse record and the first root and stores the second root in the cryptographic facility.

BRIEF DESCRIPTION OF THE DRAWINGS

These and other objects, features, and advantages of the invention will be more fully appreciated with reference to the accompanying figures.

FIG. 6 illustrates the relationship between indexes of records and null records in the Record File (RF) and indexes in the MDC Vector (MDCV).

FIG. 8 illustrates a transaction message containing an account number to be debited, an account number to be credited, an amount, a transaction sequence number, and other options\information.

FIG. 9 illustrates a purse record containing a financial institution account number, an account balance, a transaction sequence number, and other optional account data.

FIG. 11 is a flow diagram of the invention.

DESCRIPTION OF THE BEST MODE FOR CARRYING OUT THE INVENTION

A tree authentication algorithm makes use of a public one-way cryptographic function. The described invention makes of a public one-way cryptographic function used in the calculation of a Modification Detection Code (MDC) which is based on the Data Encryption Algorithm (DEA). Modification Detection Codes are described in U.S. Pat. No. 4,908,861 by Brachtl et al. Those skilled in the art will recognize that other public one-way cryptographic functions could be used with the invention without detracting from the spirit of the invention.

The tree authentication algorithm method makes use of a binary tree of $2^n - 1$ elements. Beginning with a root element, each element in the tree has two successor elements, except for the $2^{n-1}$ final elements, which have no successor elements. Those skilled in the art will recognize that tree authentication algorithms could also be based on other than binary trees without detracting from the spirit of the invention, so that each element in the tree may in fact have three, four, etc., successor elements.

Figure 1:
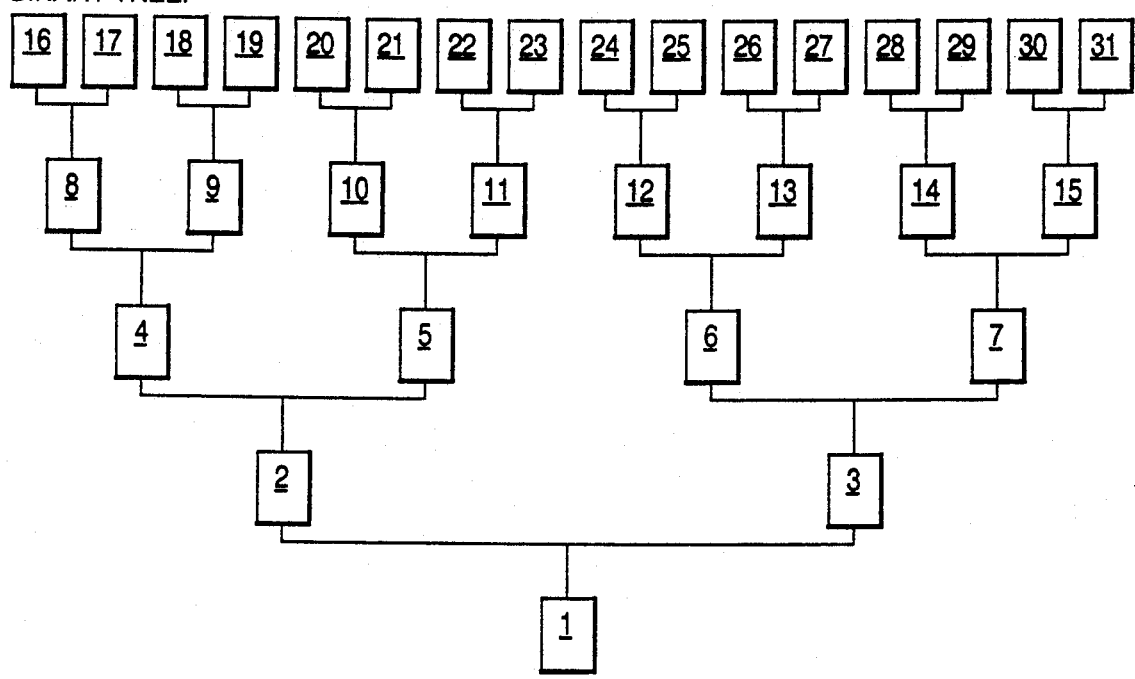
FIG. 1 illustrates a binary tree with $2^5 - 1 = 31$ elements.

FIG. 1 illustrates a binary tree with $2^5 - 1 = 31$ elements, which are labelled 1, 2, ..., 31. The root element is labelled 1; the $2^{n-1} = 16$ final elements are labelled 16, 17, ..., 31.

The tree authentication algorithm defines the following objects:

| Object | Description |
|---|---|
| Record File (RF) | The RF contains t records, denoted $\{R_1, R_2, \ldots, R_t\}$, which represent the records to be authenticated by the tree authentication algorithm. The records in RF can be actual records or dummy records (e.g., allocated and initialized to ASCII zeroes). |
| MDC Vector (MDCV) | MDCV is a vector of $s = 2^n - 1$ elements, where n is selected such that it satisfies the relationship $2^{n-2} < t \leq 2^{n-1}$, where $n, n-1$, and $n-2$ are non-negative integers. Each element i in MDCV, denoted MDCV(i) is a 128-bit Modification Detection Code (MDC). The MDCV is just a linear representation of a binary tree where each element of the tree, j, has an MDC associated with it, denoted MDCV(j). Where convenient, the elements MDCV(1), MDCV(2), ..., MDCV(s) may sometimes be expressed as $MDC_1, MDC_2, \ldots, MDC_s$. The algorithm for producing the MDC values in MDCV is given below. |
| Root MDC (RMDC) | The RMDC is defined as the first element in MDC Vector, denoted MDCV(1). |
| Path Vector (PV) | For a binary tree of $s = 2^n - 1$ elements, PV is a vector of n index values, denoted $\{I_1, I_2, \ldots, I_n\}$. These index values describe the path from a final element in the tree to the root element. An algorithm for calculating PV is given below. |
| Path MDC Vector (PMDCV) | For a binary tree of $s = 2^n - 1$ elements, the PMDCV is a vector of n MDCs, denoted $\{MDC_1, MDC_2, \ldots, MDC_n\}$, where $PMDCV(i) = MDCV(PV(i))$ for $i = 1, 2, \ldots, n$. That is, the PMDCV contains just the MDCs in MDCV that correspond to the indexes in PV. |
| Authentication Vector (AV) | For a binary tree of $s = 2^n - 1$ elements, the AV is a vector of $n-1$ index values, denoted $\{I_1, I_2, \ldots, I_{n-1}\}$. The indexes in AV are derived from PV using the following algorithm. For $i = 1, 2, \ldots, n-1$, $AV(i) = PV(i+1)$ if i is and even integer and $AV(i) = PV(i-1)$ if i is an odd integer. |
| Authentication MDC Vector (AMDCV) | For a binary tree of $s = 2^n - 1$ elements, the AMDCV is a vector of $n-1$ MDCs, denoted $\{MDC_1, MDC_2, \ldots, MDC_{n-1}\}$, where $AMDCV(i) = MDCV(AV(i))$ for $i = 1, 2, \ldots, n-1$. That is, the AMDCV contains just the MDCs in MDCV that correspond to the indexes in AV. |

The Record File may be static or dynamic. In a static file, records are not added, deleted, or updated. In a dynamic file, the opposite is true. Records in the Record File may be fixed or variable length. MDCs can be calculated on records of any length. The Record File can be managed either by the system software or by the application program.

The Record File may contain actual records, dummy records, or both. Altogether, the Record File contains t records. A dummy record is a record for which space has been allocated in the Record File. For convenience, it is assumed that dummy records are initialized to ASCII zeroes.

Before records in the Record File can be authenticated, an MDC Vector must be produced. The MDC Vector is calculated from the records in the Record File using a Generate Modification Detection Code (GMDC) instruction described below. Hence, if the Record File is static, then the MDC Vector will be static. Likewise, if the Record File is dynamic, then the MDC Vector will be dynamic. One or more MDCs in the MDC Vector must be recalculated and changed whenever a record in the Record File is added, deleted, or updated.

The first element in the MDC Vector is the Root MDC. In addition to being stored in the MDC Vector, the Root MDC is also loaded and stored within the secure hardware using a Load Root MDC (LRMDC) instruction (described below). The copy of the Root MDC maintained in the secure hardware is a reference value against which other calculated Root MDC values are compared as part of the record verification process. The Root MDC maintained in the secure hardware must be changed whenever a record in the Record File is added, deleted, or updated. This may occur directly by issuing an LRMDC instruction or indirectly as the result, or by-product of the execution of some other hardware instruction. The MDC Vector can be managed by the system software or by the application program. However, for practical considerations, the Record File and MDC Vector are assumed to be managed by the same party (e.g., either the system software or the application program).

Algorithm for Calculating MDC Vector (MDCV)

The MDCV contains $2^n - 1$ elements. The $2^{n-1}$ elements in MDCV whose index values range from $2^{n-1}$ to $2^n - 1$ (i.e., corresponding to the $2^{n-1}$ final elements in a $2^n - 1$ element binary tree) are calculated from the t records in Record File and $2^{n-1} - t$ null records. The null records represent nonexistent records in Record File. The remainder of the elements, MDCV(1), MDCV(2), ..., MDCV($2^{n-1} - 1$) are calculated from elements MDCV($2^{n-1}$), MDCV($2^{n-1}+1$), ..., MDCV($2^n - 1$).

For $i = 2^{n-1}, 2^{n-1}+1, \ldots, 2^n - 1$, MDCV(i) is calculated with a public one-way cryptographic function, called oneway, as follows:

MDCV($2^{n-1}$):= oneway(concat(1,R$_1$)).
MDCV($2^{n-1}+1$):= oneway(concat(2,R$_2$)).
.
.
.
MDCV($2^{n-1}+t-1$):= oneway(concat(t,R$_t$)).
MDCV($2^{n-1}+t$):= oneway(concat(t+1,null)).
MDCV($2^{n-1}+t+1$):= oneway(concat(t+2,null)).
.
.
.
MDCV($2^n - 1$):= oneway(concat($2^{n-1}$,null)).

For elements $i = 1, 2, \ldots, 2^{n-1} - 1$, MDCV(i) is calculated as follows:

MDCV(i):= oneway(concat(i,MDCV(2×i),MDCV(2×i+1))).

Note: The function oneway is used merely as a means to conveniently describe the operation of the tree authentication algorithm. A more precise and detailed algorithm for calculating MDCs using a Generate MDC (GMDC) routine is given below.

The Path Vector and Authentication Vector are defined here only to help explain the concept of tree authentication. In an actual implementation, these two vectors are not needed.

Algorithm for Calculating Path Vector (PV)

If MDCV is an MDC Vector with $2^n - 1$ elements and i is an index whose value ranges from $2^{n-1}$ to $2^n - 1$, then the PV vector of n index values ($i_1, i_2, \ldots, i_n$) is calculated as follows:

$i_1$ := i.
$i_2$ := integer($i_1 \div 2$).
$i_3$ := integer($i_2 \div 2$).
.
.
.
$i_n$ := integer($i_{n-1} \div 2$).

Algorithm for Calculating Authentication Vector (AV)

If MDCV is an MDC Vector with $2^n - 1$ elements and i is an index whose value ranges from $2^{n-1}$ to $2^n - 1$, then the AV vector of n−1 index values ($i_1, i_2, \ldots, i_{n-1}$) is calculated as follows:

$i_1$ := opposite(i).
$i_2$ := opposite(interger($i_1 \div 2$)).
$i_3$ := opposite(interger($i_2 \div 2$)).
.
.
.
$i_{n-1}$ := opposite(integer($i_{n-2} \div 2$)).

The Authentication MDC Vector is created dynamically each time a record in the Record File is authenticated by the secure hardware. The Authentication MDC Vector, and the Root MDC stored in the secure hardware, are used by the hardware to authenticate the record. Each record in the Record File has a different Authentication MDC Vector associated with it. The Authentication MDC Vector is created from the record to be authenticated and the MDC Vector.

To produce the Authentication MDC Vector from a given record, it is first necessary to know or determine the relative position of the record in the Record File. For example, given a record R, one must be able to determine that R is, say, the ith record in the Record File. Thus, for convenience, a mapping function FINDX is assumed to exist that maps a given record to its index value in the Record File. For example, if $R_i$ denotes the ith record in the Record File, then FINDX-($R_i$)=i. An algorithm for calculating the Authentication MDC Vector from a given record, say $R_i$, and the MDC Vector is provided below.

If the Record File and MDC Vector are maintained by the system software, then the Authentication MDC Vector is created by the system software, If the Record File and MDC Vector are maintained by the application program, then the Authentication MDC Vector is created by the application program.

The Path MDC Vector is created dynamically each time a record in the Record File is authenticated and then updated. Each record in the Record File has a different Path MDC Vector associated with it. The Path MDC Vector is created in the secure hardware using the Authentication MDC Vector associated with record R and the updated record R'.

A new Root MDC is also calculated with the Authentication MDC Vector and the just-computed Path MDC Vector. The secure hardware replaces the current Root MDC with the new Root MDC.

The updated record and Path MDC Vector are also returned to the system software, and to the application program if the application program maintains the Record File and the MDC Vector. The updated record and Path MDC Vector are then used to update the Record File and MDC Vector, respectively.

CRYPTOGRAPHIC SYSTEM MODEL

The tree authentication algorithm is implemented within a cryptographic system described by the following architectural model.

Figure 2:
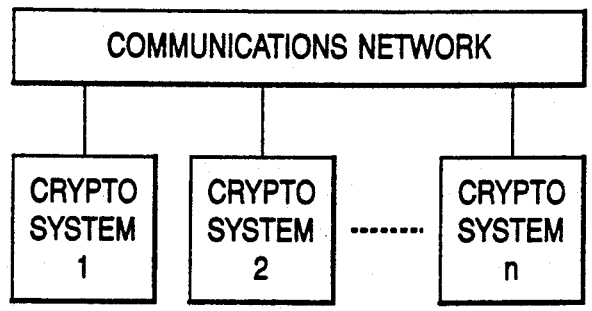
FIG. 2 illustrates a cryptographic network consisting of multiple cryptographic systems interconnected via a communications network.

FIG. 2 illustrates a cryptographic network consisting of multiple cryptographic systems interconnected via a communications network. Each system supports the processing of one or more applications which require access to cryptographic services (e.g., for the encryption, decryption, and authentication of application data and the generation and installation of cryptographic keys). The cryptographic services are provided by a secure cryptographic facility in each system. The network provides the means for the systems to send and receive encrypted data and keys. Various protocols (i.e., formats and procedural rules) govern the exchange of cryptographic quantities between communicating systems in order to ensure interoperability but are beyond the scope of this document.

Figure 3:
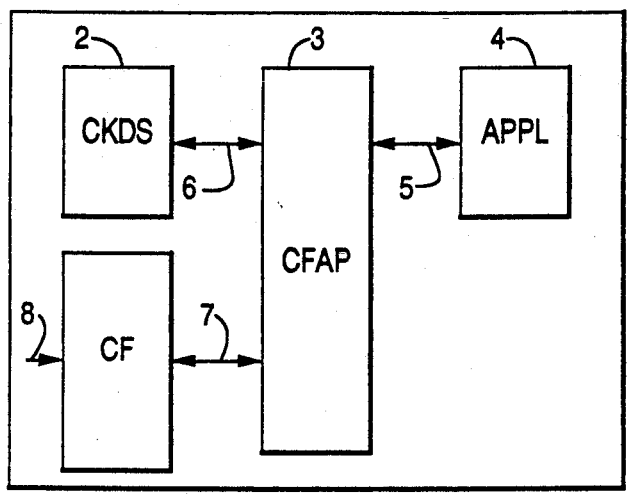
FIG. 3 illustrates a cryptographic system consisting of a Cryptographic Facility (CF) 1, a Cryptographic Key Data Set (CKDS) 2, a Cryptographic Facility Access Program (CFAP) 3, and using Application Programs (APPL) 4.

FIG. 3 illustrates a cryptographic system consisting of a Cryptographic Facility (CF) 1, a Cryptographic Key Data Set (CKDS) 2, a Cryptographic Facility Access Program (CFAP) 3, and using Application Programs (APPL) 4.

A typical request for cryptographic service is initiated by an APPL 4 via a function call to the CFAP 3 at an APPL-To-CFAP interface 5. The service request includes key and data parameters, as well as key identifiers which the CFAP 3 uses to access encrypted keys from the CKDS 2 at a CFAP-To-CKDS interface 6. The CFAP 3 processes the service request by issuing one or more cryptographic instructions to the CF 1 at a CFAP-To-CF interface 7. (The CF may also have an optional physical interface 8 for direct entry of cryptographic variables into the CF.) Each cryptographic instruction invoked at the CFAP-To-CF interface 7 has a set of input parameters processed by the CF to produce a set of output parameters returned by the CF 1 to the CFAP 3. In turn, the CFAP 3 may return output parameters to the APPL 4; it may also use the output parameters as input parameters to subsequently invoked instructions. If the output parameters contain encrypted keys, then CFAP 3 may, in cases, store these encrypted keys in the CKDS 2.

Figure 4:
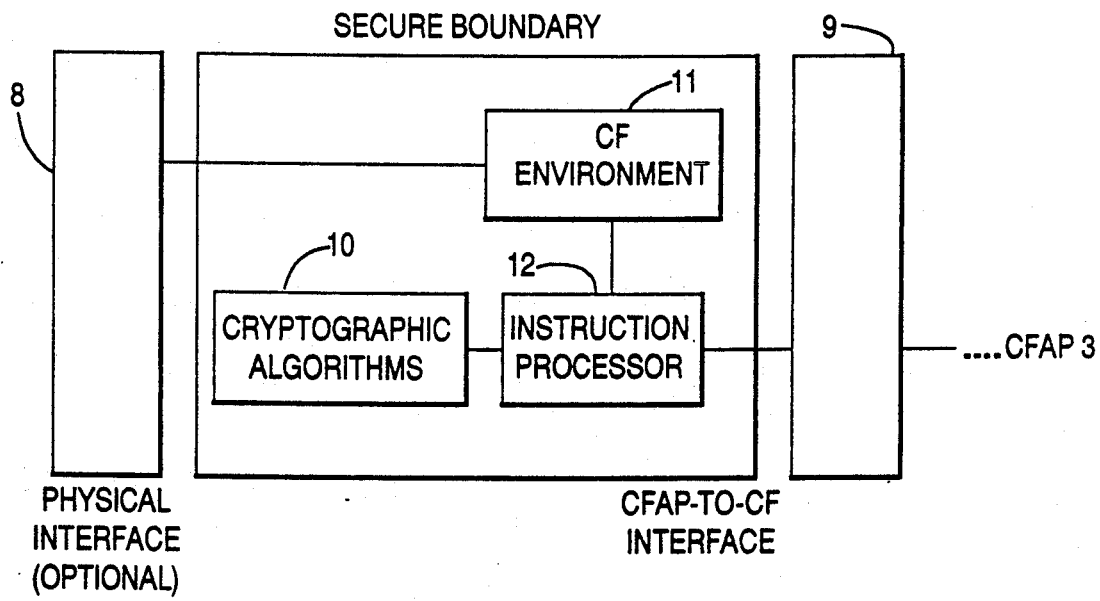
FIG. 4 illustrates a Cryptographic Facility 1 consisting of a CF Environment 10, Cryptographic Algorithms 11, and an Instruction Processor 12, enclosed within a Secure Boundary.

FIG. 4 illustrates a Cryptographic Facility 1 consisting of a CF Environment 10, Cryptographic Algorithms 11, and an Instruction Processor 12, all of which are enclosed within a Secure Boundary. The Instruction Processor 12 is a functional element which executes cryptographic instructions invoked by the CFAP 3 at the CFAP-to-CF interface 9. For each instruction, the CFAP-to-CF interface 9 defines (1) an instruction mnemonic or operation code used to select a particular instruction for execution, (2) a set of input parameters passed from the CFAP to the CF, and (3) a set of output parameters returned by the CF to the CFAP. The Instruction Processor 12 executes the selected instruction by performing an instruction-specific sequence of cryptographic processing steps whose control flow and subsequent output depend on the values of the input parameters and the contents of the CF Environment 10. The CF Environment 10 consists of a set of cryptographic variables (e.g., keys, flags, counters, CF configuration data, etc.) which are collectively stored within the CF. The CF Environment variables are initialized via the CFAP-to-CF interface 9 (i.e., by execution of certain CF instructions which read input parameters and load them into the CF environment 11) or via an optional Physical Interface 8 which permits cryptovariables to be loaded directly into the CF Environment 11 (e.g., via an attached key entry device).

The secure boundary enclosing the cryptographic facility is achieved through the use of one or more of the following features: tamper-resistant design, tamper-detection circuitry, and zeroization of keys. Tamper-resistant designs enables the CF to resist probing by an insider adversary who has limited access to the CF. Tamper-detection circuitry enables the CF to detect attempts at physical probing or intrusion, e.g., through the use of a variety of electro-mechanical sensing devices. Zeroization circuitry enables the CF to automatically erase its keys whenever an attempted probing or intrusion has been detected.

The Instruction Processor 12 consists of a set of instructions and a set of internal routines. The CF instructions are invoked at the CFAP-To-CF interface 9, and provide cryptographic services to the CFAP 3. The internal routines are invoked only from within the CF 1. They represent a set of algorithms and processing functions that are common to many CF instructions.

The tree authentication algorithm makes use of a public one-way cryptographic function based on the Data Encryption Algorithm (DEA). The DEA is described in the American National Standards Institute (ANSI) Data Encryption Algorithm (DEA) X3.92-1981. See American National Standard X3.92-1981, *Data Encryption Algorithm*, American National Standards Institute, New York (Dec. 31, 1981). The DEA is a symmetric algorithm which encrypts or decrypts a 64 bit input with a 64 bit key to produce a 64 bit output. The 64 bit key specified to the algorithm consists of 56 key bits used by the algorithm and 8 non-key bits, which optionally may be used for error detection. The algorithm specified in this standard is identical to the algorithm specified in Federal Information Processing Standard Publication 46, entitled Data Encryption Standard.

Figure 5:
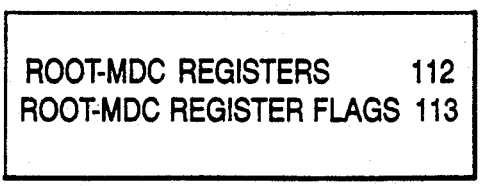
FIG. 5 illustrates a CF Environment 11 containing storage for 64 128-bit Root MDC registers 112 and 64 Root MDC register flags 113.

The CF Environment 11 contains storage for 64 128-bit Root MDC registers 112 and 64 Root MDC register flags 113, as illustrated in FIG. 5. The 64 Root MDC registers are stored in a Root MDC Table, not shown in FIG. 5. The 64 Root MDC register flags are stored in a CF State Vector (not shown in FIG. 5) together with other flags and state variables defining the state of the cryptographic facility 1.

The Root MDC registers 112 are indexed as Root MDC register(i), for $i = 0, 1, \ldots, 63$. The Root MDC register flags 113 are indexed as Root MDC register flag(i), for $i = 0, 1, \ldots, 63$, where flag values 0 and 1 are defined as 0 = 'not initialized' and 1 = 'initialized'. Where convenient, the subject invention shall be described on the basis of only a single Root MDC stored in a single Root MDC register.

Routines

A set of routines is specified for implementing parts of the tree authentication algorithm. Some routines are implemented in the CF and called by the CF instructions and some are implemented in the CFAP and called by the CFAP functions.

The following is a list of simple mathematical functions used by the routines listed in this section, and elsewhere.

integer(x) truncates x, as necessary, to produce an integer value.

opposite(x) If x is even, then opposite(x) returns x+1. If x is odd, then opposite(x) returns x−1.

concat($x_1, x_2, \ldots, x_i$) denotes the concatenation of $x_1$, $x_2, \ldots, x_i$.

extract(x,y,z) denotes to return z bytes starting at byte position y in variable x.

replace (w,x,y,z) denotes to replace z bytes starting at byte position y in variable w with the z-byte variable x.

oneway(x) denotes to return a public one-way cryptographic function of x. (The definition of oneway(x) is purposely left imprecise.)

Generate MDC (GMDC)

The Generate MDC routine is defined as follows:

GMDC(mode,text-length,text→MDC)

Inputs:
mode: One of the following:
0: Two encipherments per 64-bit input data block
1: Four encipherments per 64-bit input data block.
text-length: The length of the input text in bytes. For convenience, text-length is a multiple of 8 bytes. Padding of the input text, if required, is assumed to be performed before the text is processed by the GMDC routine.
text: The input text to be MDC'ed.
Outputs:
MDC: The 128-bit MDC (Modification Detection Code)
Algorithm Description:

An precise specification of the Generation MDC routine is unimportant to the specification of the tree authentication algorithm. The MDC produced by the GMDC routine is a public one-way cryptographic function of the input text.

Find Index (FINDX): The Find Index routine is defined as follows:

FINDX(record→i).

Inputs:
record: One of the t records in Record File.
Outputs:
i: The index of record in Record File, where i is an integer satisfying the relation $1 \leq i \leq t$.
Algorithm Description:

The FINDX routine maps a record to the index of that record in the Record File. FINDX is a routine that must be defined by the installation, since the records in Record File, their size, number, and data content are highly installation-dependent.

Record Format One (RFORM1):

The Record Format One routine is defined as follows:

RFORM1(process-rule,i,R-length,R,→rec-length,rec)

Inputs:
process-rule: Indicates the processing mode for R, as follows:
0: i is the index of an actual record in Record File
1: i is the index of a null record i: The index of record R in the Record File.
R-length: The length of R in bytes. R-length must be a multiples of 8. If required, padding must be performed by the software prior to its being processed by the hardware. This parameter is required only when process-rule=0.
R: A record in Record File. This parameter is required only when process-rule=0.
j: The number of elements in the MDCV associated with Record File.
Outputs:
rec-length: The length of rec in bytes.
rec: A formatted record.
Algorithm Description:

The RFORM1 routine builds a formatted record from the inputs i and R. An objective of the RFORM1 routine is to produce a formatted record that is independent of the number of elements in the MDC Vector. While the formatted record may depend on its relative position in Record File, it is independent of its relative position in the MDC Vector (binary tree). The RFORM1 routine represents only one possible way to produce a formatted record.

1. Perform consistency checking:
   a. Verify that j+1 is a power of 2, i.e., find the positive integer n such that $2^n - 1 = j$.
   b. Verify that n−2 and n−1 are non-negative integers.
   c. Verify that $2^{n-2} < i \leq 2^{n-1}$.
   Continue if checking succeeds; otherwise set CC status flag and jump to step 4.
2. Build Header
   a. Set HR:=16X'00'
   b. If process-rule=0, set Y1:=X'00'
   c. Else (process-rule=1) set Y1:=X'01'
   d. Replace(HR,Y1,0,1)
   e. Set Y2:=i (where Y2 is a 6-byte binary value)
   f. Replace(HR,Y2,2,6)
3. Build Output Formatted Record:
   a. If process-rule=0, then do:
      1) Set rec-length:=8
      2) Set rec:=HR
   b. Else (process-rule=1) do:
      1) Set rec-length:=8+R-length
      2) Set rec:=concat(HR,R)
4. Produce outputs:

Record Format Two (RFORM2):

The Record Format Two routine is defined as follows:

RFORM2(i,MDC1,MDC1→rec-length,rec).

Inputs:
i: A positive integer.
MDC1: A 128-bit MDC (Modification Detection Code) associated with element 2×i in the MDC Vector.
MDC2: A 128-bit MDC associated with element 2×i+1 in the MDC Vector.
Outputs:
rec-length: The length of rec in bytes.
rec: A formatted record.
Algorithm Description:

The RFORM2 routine builds a formatted record from the inputs i, MDC1, and MDC2. The RFORM2 routine represents only one possible way to produce a formatted record.
1. Perform consistency checking:

a. Verify i a positive integer.
2. Build Header
   a. Set HR:=16X'00'
   b. Set Y1:=X'02'/*X'02' distinguishes the header from one in which X'00' or X'01' is stored */
   c. Replace(HR,Y1,0,1)
   d. Set Y2:=i, where Y2 is a 6-byte binary value.
   e. Replace(HR,Y2,2,6)
   Continue if checking succeeds; otherwise set CC status flag and jump to step 4.
   Note: The value i is the index of the MDC element in MDC Vector to be produced from the formatted record output from the RFORM2 routine. The value i is made part of the formatted record to add cryptographic strength to the tree authentication algorithm. It blocks attacks where one subtree is substituted for another in the authentication tree.
3. Build Output Formatted Record:
   a. Set rec-length:=40
   b. Set rec:=concat(HR,MDC1, MDC2)
4. Produce outputs:

Verify Record (VREC):

The Verify Record routine is defined as follows:

VREC(root-MDC,i,R-length,R,hash-rule,j-,AMDCV→RC).

Inputs:
root-MDC: The root-MDC to be used to authenticate R.
i: The index of record R in the Record File.
R-length: The length of R in bytes. This parameter is required only when process-rule=0.
R: A record in Record File.
hash-rule: Indicates the hash algorithm, as follows:
0:MDC-2 algorithm
1:MDC-4 algorithm
j: The number of elements in AMDCV.
AMDCV: An Authentication MDC Vector.
Outputs:
RC: A Return Code, as follows
0:record verification successful
16:record verification unsuccessful.
Algorithm Description:
1. Perform Consistency Checking:
   a. Verify that j−1 is a a non-negative integer.
   b. Verify that $2^{j-1} < i \leq 2^j$.
   c. Verify that AMDCV contains j elements.
   Continue if checking succeeds; otherwise set CC status flag and jump to step 4.
2. Calculate MDC on (i,R):
   a. Set $n1:=2^{n-1}+i-1$.
   b. Perform PADR(R-length,R→rec1-length,rec1)
   c. Perform RFORM1(process-rule=0,i,R1-length,rec1→rec1-length,rec1)
   d. Perform GMDC(hash-rule,rec2-length,rec2→MDC)
   e. Set n3:=n1./*initialize n3 for next step */
3. For k=1 to <n−1> do:
   a. Set n1:=n3.
   b. Set n2:=opposite(n1).
   c. Set n3:=integer(n1÷2).
   d. If n1<n2, then perform RFORM2(n3,MDC,AMDCV(k)→rec-length,rec)
   e. Else (n1>n2) perform RFORM2(n3,AMDCV(k),MDC→rec-length,rec).
   f. Perform GMDC(hash-rule,rec-length,rec→MDC)
4. Perform verification step:
   a. Verify n3=1 (i.e., that the root has been calculated).
   b. Verify MDC=Root-MDC
5. Produce output CC and CC status flags.

Pad Record (PADR):

The Pad Record routine is defined as follows:

PADR(R1-length,R1→R2-length, R2)

Inputs:
R1-length: The length of record R1 in bytes.
R1: A record in Record File.
Outputs:
R2-length: The length of record R2 in bytes. R2-length must be a multiple of 8 bytes.
R2: The resultant record obtained by padding record R1.
Algorithm Description:
The PADR routine pads records of a whole number of bytes so that the padded record is a multiple of 8 bytes. The PADR routine pads all records irrespective of whether they are already a multiple of 8 bytes. The padding algorithm is the same as that implemented in the MDC Generate (CSNBMDG) service defined by the Common Cryptographic Architecture. See Common Cryptographic Architecture: Cryptographic Application Programming Interface Reference, SC40-1675, International Business Machines Corporation, 1990.

Generate New Path MDC Vector (GNPMDCV):

The Generate New Path MDC Vector routine is defined as follows:

GNPMDCV(hash-rule,i,R-length,R,-n,AMDCV→PMDCV).

Inputs:
hash-rule: Indicates the hash algorithm, as follows:
0:MDC-2 algorithm
1:MDC-4 algorithm
i: The index of record R in the Record File.
R-length: The length of record R in bytes.
R: A record in Record File.
n: The number of elements in PMDCV and one more than the number of elements in AMDCV.
AMDCV: An Authentication MDC Vector with n−1 elements.
Outputs:
PMDCV: A Path MDC Vector with n elements. PMDCV is the path MDC vector produced from i, R, and AMDCV.
Algorithm Description:
1. Perform Consistency Checking:
   a. Verify that AMDCV has n elements.
   b. Verify that n−2 and i are non-negative integers.
   c. Verify that $2^{n-2} < i \leq 2^{n-1}$.
   Continue if checking succeeds; otherwise set CC status flag and jump to step 5.
2. Calculate PMDCV(1):
   a. Perform PADR(R-length,R→rec1-length,rec1)
   b. Perform RFORM1(process-rule=0,i,rec1-length,rec1→rec1-length,rec2)
   c. Perform GMDC(hash-rule,rec2-length,rec2→MDC)
   d. Set PMDCV(1):=MDC.
3. Initialize n3:
   a. Set $n3:=2^{n-1}+i-1$.
4. Calculate remainder of PMDCV:
   For k=2 to n do:

a. Set n1:=n3
b. Set n2:=opposite(n1)
c. Set n3:=integer(n1÷2)
d. If n1<n2, then perform RFORM2(n3,MDC,AMDCV(k−1)→rec-length,rec)
e. Else (n1>n2) perform RFORM2(n3,AMDCV(k−1),MDC→rec-length,rec)
f. Perform GMDC(hash-rule,rec-length,rec→MDC)
g. Set PMDCV(k):=MDC
5. Produce outputs:

MDC Vector Initialize (MDCVI)

The MDC Vector Initialize routine is used by the CFAP to produce an MDC Vector for a given Record File.

The MDC Vector Initialize routine is defined as follows:

MDCVI(hash-rule,s,MDCV,t,record-file→new-MDCV,RC).

Inputs:
hash-rule: Indicates the hash algorithm, as follows:
0: MDC-2 algorithm
1: MDC-4 algorithm
s: The number of elements in MDCV
MDCV: A file of s 128-bit records initialized to zero. The elements in MDCV are uninitialized, i.e. set to zero.
t: The number of records in record-file.
Outputs:
new-MDCV: A copy of MDCV which has been initialized.
RC: A Return Code, as follows
0: success
16: failure.
Algorithm Description:
1. Perform Consistency Checking:
   a. Verify that MDCV has s elements.
   b. Verify that s+1 is a power of 2, i.e., find the positive integer n such that $2^n - 1 = j$.
   c. Verify that n−2 is a non-negative integers.
   d. Verify that $2^{n-2} < t \leq 2^{n-1}$.
   e. Verify that record-file contains t elements.
   Continue if checking succeeds; otherwise set CC status flag and jump to step 6.
2. Initialize new-MDCV:
   a. Set new-MDCV:=MDCV
3. Process records in record-file:
   For i=1 to t do:
   a. Read record $R_i$ from record-file.
   b. Perform FINDX(Ri→j)
   c. Verify i=j. Continue if checking succeeds; otherwise set RC:=16 and jump to step 6.
   d. Set Ri-length:=length of $R_i$.
   e. Perform PADR(Ri-length,Ri→rec1-length,rec1) /* ensure rec1 is a multiple of 8 bytes */
   f. Perform RFORM1(process-rule=0,i,rec1-length,rec1→rec2-length,rec2)
   g. Invoke GMDC(hash-rule,rec2-length,rec2→MDC) /* GMDC is a CF instruction */
   h. Set n1:=$2^{n-1}$+i−1.
   i. Set new-MDCV(n1):=MDC.
4. Process null records:
   For i=t+1 to s do:
   a. Perform RFORM1(process-rule=1,i,,,→rec1-length,rec1)
   b. Invoke GMDC(hash-rule,rec1-length,rec1→MDC) /* GMDC is a CF instruction */
   c. Set n1:=$2^{n-1}$+i−1.
   d. Set new-MDCV(n1):=MDC
5. Initialize remainder of new-MDCV:
   For i=$2^{n-1}$−1 to 1 by −1 do:
   a. Set n1:=2×i.
   b. Perform RFORM2(i,MDCV(n1),MDCV(n1+1)→rec1-length,rec1)
   c. Invoke GMDC(hash-rule,rec1-length,rec1→MDC) /* GMDC is a CF instruction */
   d. Set new-MDCV(i):=MDC
6. Produce outputs.

MDC Vector Update (MDCVU)

The MDC Vector Update routine is used by the CFAP to update the MDC vector in response to a change in the Record File due to adding, deleting, or updating a record in Record File.

The MDC Vector Update routine is defined as follows:

MDCVU(s,MDCV,i,PMDCV→new-MDCV,RC).

Inputs:
s: The number of elements in MDCV
MDCV: A file of s 128-bit MDC values.
i: The index of a record in Record File.
PMDCV: A Path MDC Vector for a record in Record File whose index is i.
Outputs:
new-MDCV: A copy of MDCV which has been updated.
RC: A Return Code, as follows
0: success
16: failure.
Algorithm Description:
1. Perform Consistency Checking:
   a. Verify that MDCV has s elements.
   b. Verify that s+1 is a power of 2, find positive integer n such that $2^n - 1 = s$.
   c. Verify that n−2>0.
   d. Verify that $2^{n-2} < i \leq 2^{n-1}$.
   e. Verify that PMDCV has n records.
   Continue if checking succeeds; otherwise set CC status flag and jump to step 6.
2. Initialize new-MDCV:
   a. Set new-MDCV:=MDCV
3. Update first element:
   a. Set i1:=$2^{n-1}$+i−1
   b. Set new-MDCV(i1):=PMDCV(1)
4. Update remainder of elements:
   For kequal2 to n do:
   a. Set i1:=integer(i1÷2)
   b. Set new-MDCV(i1):=PMDCV(k)
5. Verify i1=1 /* ensure tree has been traversed */
6. Produce outputs:

Generate Authentication MDC Vector (GAMDCV)

The Generate Authentication MDC Vector routine is defined as follows:

GAMDCV(i,j,MDCV→k,AMDCV).

Inputs:
i: The index of a record in Record File, where i is an integer satisfying the relation $1 \leq i \leq t$.
j: The number of elements in MDCV.

MDCV: An MDC Vector produced from the Record File containing a record whose index in the Record File is i.

Outputs:

k: The number of elements in AMDCV.

AMDCV: An Authentication MDC Vector.

Algorithm Description:

For a description of the functions called integer and opposite, see the section entitled Mathematical Functions.

1. Perform consistency checking:
   a. Verify that MDCV has j elements.
   b. Verify that $j+1$ is a power of 2, i.e., find the positive integer n such that $2^n - 1 = j$.
   c. Verify that $n-2$ and $n-1$ are non-negative integers.
   d. Verify that $2^{n-2} < i \leq 2^{n-1}$.

Continue if checking succeeds; otherwise set CC status flag and jump to step 5.

2. Determine n and initialize AMDCV(n):
   a. Set $n1 := 2^{n-1} + i - 1$.
   b. Set $n2 := \text{opposite}(n1)$.
   c. Set $AMDCV(1) := MDCV(n2)$.
   d. Set $k := n - 1$.

3. Initialize remainder of AMDCV:
   a. For $n3 = 2$ to $(k-1)$ do:
      1) Set $n1 := \text{integer}(n1 \div 2)$.
      2) Set $n2 := \text{opposite}(n2)$.
      3) Set $AMDCV(n3) := MDCV(n2)$.

4. Calculate and verify last path vector index, n2:
   a. Set $n2 := \text{integer}(n1 \div 2)$.
   b. Verify $n2 = 1$.

5. Produce outputs:

CF Instructions

The following set of instructions permits the tree authentication algorithm to be implemented by the CF.

Generate MDC (GMDC)

The Generate MDC instruction is defined as follows:

GMDC(mode, text-length, text→MDC).

Inputs:

mode: One of the following:
0: Two encipherments per 64-bit input data block
1: Four encipherments per 64-bit input data block.

text-length: The length of the input text in bytes. For convenience, text-length is a multiple of 8 bytes. Padding of the input text, if required, is assumed to be performed before the text is processed by the GMDC routine.

text: The input text to be MDC'ed.

Outputs:

MDC: The 128-bit MDC (Modification Detection Code)

Algorithm Description:

The GMDC instruction is implemented by making a subroutine call to the GMDC routine (see the section entitled Routines). The GMDC instruction is just the externalized version of the internal GMDC routine.

Load Root MDC (LRMDC): The Load Root MDC instruction is defined as follows:

LRMDC(index, new-MDC→flag, old-MDC)

Inputs:

index: A value from 0 to 63 that references one of 64 Root-MDC registers in the secure hardware.

new-MDC: A new 128-bit MDC to be loaded into the Root-MDC register designated by index.

Outputs:

flag: A value indicating whether old-MDC exists, as follows:
0: no old-MDC exists
1: old-MDC exists.

old-MDC: A 128-bit MDC (Modification Detection Code), if flag=1.

Algorithm Description:

The following assumptions are made about the secure hardware. The secure hardware contains 64 Root-MDC registers indexed as 0, 2, ..., 63. Associated with each Root-MDC register is a 1-bit Root-MDC register flag (0=empty, 1=full).

The LRMDC instruction assumes that the secure hardware provides for the storage of several Root-MDC values, so that the tree authentication algorithm can authenticate records in several Record Files. Another way to handle multiple Record Files is to make use of a Record File of Root MDC values and to store a single Root MDC in the secure hardware, where this single Root MDC is calculated on the Record File of Root MDC values. Those skilled in the art will recognize that the subject invention covers the case of multiple Record Files and the case of a Record File of Root MDC values.

1. Perform Consistency Checking:
   a. Verify that index is a value 0, 1, ..., 63.
2. Produce outputs flag and old-MDC:
   a. Set flag:=Root-MDC register flag (index)
   b. Set old-MDC:=Root-MDC register (index)
3. Load new-MDC:
   a. Set Root-MDC register flag (index):='full'
   b. Set Root-MDC register (index):=new-MDC

Read Root MDC (RRMDC)

The Read Root MDC instruction is defined as follows:

RRMDC(index→flag, MDC).

Inputs:

index: A value from 0 to 63 that references one of 64 Root-MDC registers in the secure hardware.

Outputs:

flag: A value indicating whether MDC exists, as follows:
0: no MDC exists
1: MDC exists MDC: A 128-bit MDC (Modification Detection Code), if flag=1.

Algorithm Description:

The following assumptions are made about the secure hardware. The secure hardware contains 64 Root-MDC registers indexed as 0, 2, ..., 63. Associated with each Root-MDC register is a 1-bit Root-MDC register flag (0=empty, 1=full).

1. Perform Consistency Checking:
   a. Verify that index is a value 0, 1, ..., 63.
2. Produce outputs flag and old-MDC:
   a. Set flag:=Root-MDC register flag (index)
   b. Set MDC:=Root-MDC register (index)

Update Records (URECS)

The Update Records instruction is defined as follows:

URECS(index, hash-rule, Ri-length, Ri, Rj-length, Rj, Ri'-length, Ri', Rj'-length, Rj', s, AMDCVi, AMDCVj→n, PMDCVi, PMDCVj, RC).

Inputs:
index: A value from 0 to 63 that references one of 64 Root-MDC registers in the secure hardware.
hash-rule: Indicates the hash algorithm, as follows:
  0: MDC-2 algorithm
  1: MDC-4 algorithm
Ri-length: The length of record Ri in bytes.
Ri: A record in Record File whose position in the file is specified by index i.
Rj-length: The length of record Rj in bytes.
Rj: A record in Record File whose position in the file is specified by index j.
Ri'-length: The length of record Ri' in bytes.
Ri': A copy of record Ri which has been updated.
Rj'-length: The length of record Rj' in bytes.
Rj': A copy of record Rj which has been updated.
s: The number of elements in the MDC Vector associated with the Record File containing records Ri, Rj, (updated to Ri', and Rj').
AMDCVi: An Authentication MDC Vector for authenticating record Ri.
AMDCVj: An Authentication MDC Vector for authenticating record Rj.

Outputs:
n: The number of elements in PMDCVi and PMDCVj: and one more than the number of elements in AMDCVi and AMDCVj.
PMDCVi: A Path MDC Vector associated with record Ri'.
PMDCVj: A Path MDC Vector associated with record Rj'.
RC: A Return Code, as follows
  0: success
  16: failure.

Algorithm Description:
1. Perform Consistency Checking:
   a. Verify that index is a value 0, 1, . . . , 63.
   b. Verify that Root-MDC register flag (index)='full'
   c. Verify that s+1 is a power of 2, find positive integer n such that $2^n - 1 = s$.
   d. Verify that $n - 2 > 0$.
   e. Perform FINDX(Ri→i) /* find index i */
   f. Perform FINDX(Rj→j) /* find index j */
   g. Verify that $2^{n-2} < i \leq 2^{n-1}$.
   h. Verify that $2^{n-2} < j \leq 2^{n-1}$.
   Continue if checking succeeds; otherwise set CC status flag and jump to step 6.
2. Authenticate Ri and Rj:
   a. Set root-mdc:=MDC stored in Root-MDC register(index).
   b. Perform VREC(root-mdc,i,Ri-length, Ri,hash-rule,n-1,AMDCVi→RC)
   c. Verify RC=0
   d. Perform VREC(root-mdc,j,Rj-length,Rj,hash-rule,n-1,AMDCVj→RC)
   e. Verify RC=0
3. Calculate PMDCVi:
   a. Perform GNPMDCV(hash-rule,i,Ri'-length,Ri',n,AMDCVi→PMDCVi)
4. Update AMDCVj using PMDCVi:
   a. Set i1:=$2^{n-1}+i-1$
   b. Set j1:=opposite($2^{n-1}+j-1$)
   c. If i1=j1 then do:
      1) Set AMDCVj(1):=PMDCVi(1)
      2) Jump to step 5. /* no more elements need to be updated */
   d. For k=2 n-1 do:
      1) Set i1:=integer(i÷2))
      2) Set j1:=opposite(integer(j1÷2))
      3) If i1=j1 then do:
         a) Set AMDCVj(k):=PMDCVi(k)
         b) Jump to step 5. /* no more elements need to be updated */
5. Calculate PMDCVj:
   a. Perform GNPMDCV(hash-rule,j,Rj'-length,Rj',n,AMDCVj→PMDCVj)
6. Produce outputs: /* Note that PMDCVi must be processed before PMDCVj to update MDCV. Some old elements in PMDCVi may be overlaid by new elements in PMDCVj */

CFAP Functions

A list of functions is provided that an implementer might find useful in achieving an implementation of a tree authentication algorithm. An implementer may find it useful to implement one of more of the functions as internal routines, called by higher-level CFAP functions that may be invoked via a service call at the application-to-CFAP interface. Whereas for others, it may be found convenient to externalize them directly at the application-to-CFAP interface.

The list of CFAP functions is this:
1. Record File Create
2. Record Verify
3. Record Add
4. Record Delete
5. Record Update Record File Create: The CFAP creates an MDC Vector from Record File. A Load Root MDC instruction is then executed to load the root MDC into the CF.

Record Verify (RECV) The Root MDC is read from the CF using a Read Root MDC (RRMDC) instruction and verification is performed against a CFAP-calculated Root MDC. Another option allows the CFAP to calculate an Authentication MDC Vector for the record to be verified and to pass this and the record to the CF for verification. The CF authenticates the record by calculating a Root MDC, which it compares for equality against a Root MDC stored in the CF.

Record Add (RECA): The CFAP updates the MDC Vector on the basis of the record to be added to Record File. A Load Root MDC instruction is then executed to load the new root MDC into the CF.

Record Delete (RECD): The CFAP updates the MDC Vector on the basis of the record to be deleted from Record File. A Load Root MDC instruction is then executed to load the new root MDC into the CF.

Record Update (RECU): The CFAP updates the MDC Vector on the basis of the record to be updated within Record File. A Load Root MDC instruction is then executed to load the new root MDC into the CF. Another options allows the root MDC to be calculated in the CF from the updated record and the root MDC stored in the CF to be replaced by the CF-calculated MDC. This second option may lead to implementations with better performance or better integrity or both.

An Example

The following example illustrates the relationship of the MDC Vector, Path Vector, Path MDC Vector, Authentication Vector, and Authentication MDC Vector.

Given a Record File with $t=13$ Records:

Let $\{R_1, R_2, \ldots, R_{13}\}$ denote a Record File of $t=13$ records.

Determine $n=5$:

To find n, first find positive integers $n-2$ and $n-1$ that satisfy the relation $2^{n-2} < t \leq 2^{n-1}$. For $t=13$, we see that positive integers 3 and 4 satisfy the relation $2^3 < 13 \leq 2^4$, so that $n=5$.

Determine the Null Records.:

To calculate the MDC Vector (MDCV), we define $2^{n-1} - t = 2^4 - 13 = 3$ null records.

Calculate MDC Vector:

The 13 records in Record File and the 3 null records give a total of 16 records (i.e., $2^4$ records). The MDCs calculated on these 16 records fill positions 16 thru 31 of the MDC Vector. FIG. 6 illustrates the relationship between indexes of records and null records in the Record File (RF) and indexes in the MDC Vector (MDCV).

If i is the index in RF, then the index j in MDCV is calculated as $j = 2^{n-1} + i - 1$, where $n=5$ in our example. The corresponding MDC values in MDCV are calculated using the oneway function, as follows:

1. Set MDCV(16):=oneway(concat(1, $R_1$)).
2. Set MDCV(17):=oneway(concat(2, $R_2$)).
3. Set MDCV(18):=oneway(concat(3, $R_3$)).
4. Set MDCV(19):=oneway(concat(4, $R_4$)).
5. Set MDCV(20):=oneway(concat(5, $R_5$)).
6. Set MDCV(21):=oneway(concat(6, $R_6$)).
7. Set MDCV(22):=oneway(concat(7, $R_7$)).
8. Set MDCV(23):=oneway(concat(8, $R_8$)).
9. Set MDCV(24):=oneway(concat(9, $R_9$)).
10. Set MDCV(25):=oneway(concat(10, $R_{10}$)).
11. Set MDCV(26):=oneway(concat(11, $R_{11}$)).
12. Set MDCV(27):=oneway(concat(12, $R_{12}$)).
13. Set MDCV(28):=oneway(concat(13, $R_{13}$)).
14. Set MDCV(29):=oneway(concat(14, null)).
15. Set MDCV(30):=oneway(concat(15, null)).
16. Set MDCV(31):=oneway(concat(16, null)).

The remaining 15 MDC values in MDC Vector are calculated with function oneway, as follows:

1. Set MDCV(15):=oneway(concat(15, MDCV(30), MDCV(31))).
2. Set MDCV(14):=oneway(concat(14, MDCV(28), MDCV(29))).
3. Set MDCV(13):=oneway(concat(13, MDCV(26), MDCV(27))).
4. Set MDCV(12):=oneway(concat(12, MDCV(24), MDCV(25))).
5. Set MDCV(11):=oneway(concat(11, MDCV(22), MDCV(23))).
6. Set MDCV(10):=oneway(concat(10, MDCV(20), MDCV(21))).
7. Set MDCV(9):=oneway(concat(9, MDCV(18), MDCV(19))).
8. Set MDCV(8):=oneway(concat(8, MDCV(16), MDCV(17))).
9. Set MDCV(7):=oneway(concat(7, MDCV(16), MDCV(17))).
10. Set MDCV(6):=oneway(concat(6, MDCV(12), MDCV(13))).
11. Set MDCV(5):=oneway(concat(5, MDCV(10), MDCV(11))).
12. Set MDCV(4):=oneway(concat(4, MDCV(8), MDCV(9))).
13. Set MDCV(3):=oneway(concat(3, MDCV(6), MDCV(7))).
14. Set MDCV(2):=oneway(concat(2, MDCV(4), MDCV(5))).
15. Set MDCV(1):=oneway(concat(1, MDCV(2), MDCV(3))).

From this example, one sees that the 31 MDC values in MDCV are associated with a binary tree of 31 elements, as illustrated in FIG. 1. Referring to FIG. 1, note that the MDC associated with element 15 is calculated from its successor elements 30 and 31; the MDC value associated with element 14 is calculated from its successor elements 28 and 29, and so forth. The root MDC associated with element 1 is calculated from its successor elements 2 and 3.

Calculate Path Vector for Records R6 and R11:

The process of calculating the Path Vector (PV) is illustrated here for records $R_6$ and $R_{11}$. In our example, $n=5$, so that PV contains $n=5$ elements $I_1, I_2, \ldots, I_5$. We first note that $R_6$ is mapped by find index function FINDX to value 6, i.e., FINDX($R_6$)=6. Likewise, $R_{11}$ is mapped by find index function FINDX to value 11. Thus, in the binary tree of $2_n - 1$ elements, where $n=5$, records $R_6$ and $R_{11}$ are associated with elements 21 and 26, i.e., by evaluating the formula $2^{n-1} + i - 1$ at $i=6$ and $i=11$, respectively, for $n=5$. The index values in the binary tree representing the path from element 21 are calculated as follows:

1. Set $i_1 := 21$.
2. Set $i_2 := $integer$(21 \div 2) = 10$.
3. Set $i_3 := $integer$(10 \div 2) = 5$.
4. Set $i_4 := $integer$(5 \div 2) = 2$.
5. Set $i_5 := $integer$(2 \div 2) = 1$.

Thus, PV of $21 = \{21, 10, 5, 2, 1\}$. The index values in the binary tree representing the path from element 26 are calculated as follows:

1. Set $i_1 := 26$.
2. Set $i_2 := $integer$(26 \div 2) = 13$.
3. Set $i_3 := $integer$(13 \div 2) = 6$.
4. Set $i_4 := $integer$(6 \div 2) = 3$.
5. Set $i_5 := $integer$(3 \div 2) = 1$.

Thus, PV of $26 = \{26, 13, 6, 3, 1\}$.

Calculate Authentication Vector for Records R6 and R11:

The process of calculating the Authentication Vector (AV) is illustrated here for records $R_6$ and $R_{11}$. In our example, $n=5$, so that AV contains $n-1=4$ elements $I_1, I_2, \ldots, I_4$. The "AV of 21" is calculated from the "PV of 21"=$\{21, 10, 5, 2, 1\}$, as follows:

1. Set $i_1 := $opposite(PV(1))=opposite(21)=20.
2. Set $i_2 := $opposite(PV(2))=opposite(10)=11.
3. Set $i_3 := $opposite(PV(3))=opposite(5)=4.
4. Set $i_4 := $opposite(PV(4))=opposite(2)=3.

Thus, AV of $21 = \{20, 11, 4, 3\}$.

The "AV of 26" is calculated from the "PV of 26"=$\{26, 13, 6, 3, 1\}$, as follows:

1. Set $i_1 := $opposite(PV(1))=opposite(26)=27.
2. Set $i_2 := $opposite(PV(2))=opposite(13)=12.
3. Set $i_3 := $opposite(PV(3))=opposite(6)=7.
4. Set $i_4 := $opposite(PV(4))=opposite(3)=2.

Thus, AV of $26 = \{27, 12, 7, 2\}$.

Figure 7:
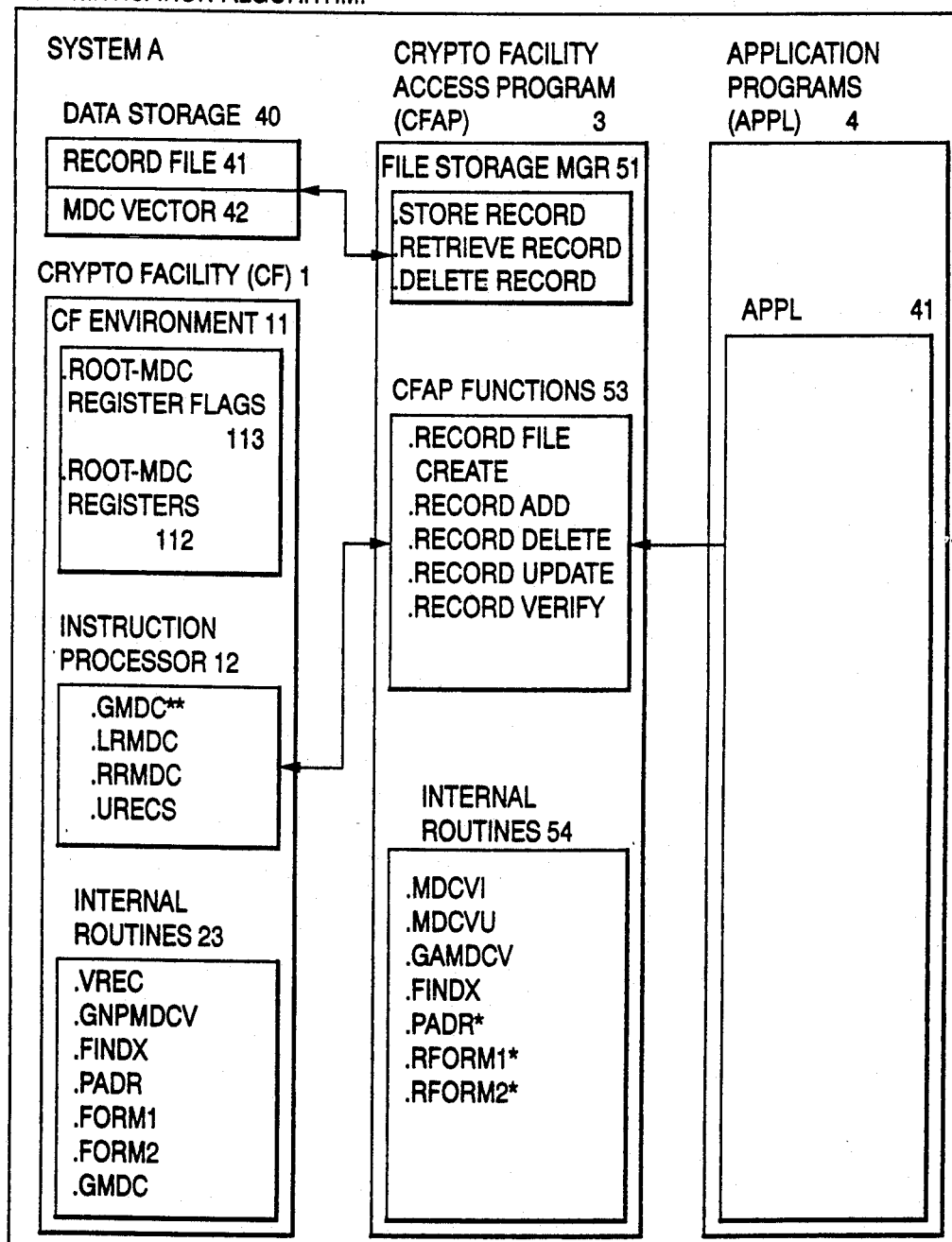
FIG. 7 illustrates a cryptographic system and the cryptographic system components needed to implement the tree authentication algorithm.

FIG. 7 illustrated a cryptographic system and the cryptographic system components needed to implement the tree authentication algorithm. The reader will note that several of routines (FINDX, PADR, RFORM1, and RFORM2) are implemented both in the CF and the CFAP. The GMDC routine is externalized as a CF instruction, and hence does not appear as an internal routine within the CFAP.

Data storage 40 contains a Record File 41 and MDC Vector 42. Record File 41 is a file of records to be authenticated and MDC Vector 42 is a vector of MDC values used by the tree authentication algorithm to authenticate records in Record File 41.

Cryptographic Facility 1 contains a CF Environment 11, an Instruction Processor 12, and Internal Routines 23. CF Environment 11 contains 64 Root-MDC Registers 112 and 64 Root-MDC Register Flags 113. Instruction Processor 12 contains Generate MDC (GMDC), Load Root MDC (LRMDC), Read Root MDC (RRMDC), and Update Records (URECS) instructions. The GMDC instruction is implemented as a call to the GMDC internal routine. Internal Routines 23 contains Verify Record (VREC), Generate New Path MDC Vector (GNPMDCV), Find Index (FINDX), Pad Record (PADR), Record Format One (RFORM1), Record Format Two (RFORM2), and Generate MDC (GMDC) routines.

Cryptographic Facility Access Program 3 contains a File Storage Manager 51, CFAP Functions 53, and Internal Routines 54. CFAP Functions 53 contains MDC Vector Create, MDC Vector Initialize, Record Verify, Record Update, and Record Delete functions. Internal Routines 54 contains MDC Vector Initialize (MDCVI), MDC Vector Update (MDCVU), Generate Authentication MDC Vector (GAMDCV), Find Index (FINDX), Pad Record (PADR), Record Format One (RFORM1), and Record Format Two (RFORM2) routines.

Records in the electronic purse are updated at the central facility in response to transaction messages received from member institutions. As illustrated in FIG. 8, a transaction message consists of an account number to be debited, an account number to be credited, an amount, a transaction sequence number, and other information unimportant to the present discussion. The transaction message directs the central facility to debit the first account by the amount indicated in the amount field and to credit that same amount to the second account. The account debited is the account belonging to the originator of the transaction message. The premise here is that a member institution has nothing to gain by falsely directing the central facility to debit his account. Thus, an authentication scheme is implemented to prevent a member institution from impersonating another member institution and thereby falsely debiting that account and crediting his own account.

Each transaction is MACed with a MAC key shared between the central facility and the member institution. Note that an alternate embodiment could make use of digital signatures based on a public key algorithm such as the RSA algorithm instead of message authentication codes based on a private key algorithm such as the DEA. Those skilled in the art will recognize that such an alternate embodiment does not depart from the spirit of the invention. The originating member institution has a MAC key capable of generating MACs and the central facility has a copy of the same key, but has only a capability to verify MACs with the key. With a private key algorithm such as the DEA, control vectors are used to specify the uses of the keys so that one copy of the key can be used to generated MACs while another copy of the same key can be used only to verify MACs. If a public key algorithm is implemented instead of a private key algorithm, then signatures are generated with a private key and signatures are verified with a public key different from the private key. Each member financial institution has an account with the central facility, so that the purse contains a single purse record for each member financial institution. As illustrated in FIG. 9, a purse record contains a financial institution account number, an account balance, a transaction sequence number, and other account data unimportant to the present discussion. The transaction sequence number is a value shared between the member institution and the central facility, and is used by the member institution and central facility to ensure that each transaction sent from the member institution to the central facility is uniquely identified. A received transaction is valid only if the transaction sequence number is 1 greater than the value of the transaction sequence number stored in the purse record for that member institution. Those skilled in the art will recognize that other means could be used to ensure that transactions are received in the proper order, e.g., that the next transaction sequence number is greater (but not necessarily 1 greater) than the transaction sequence number of the last processed transaction, and that implementing such other means does not depart from the spirit of the invention.

Figure 10:
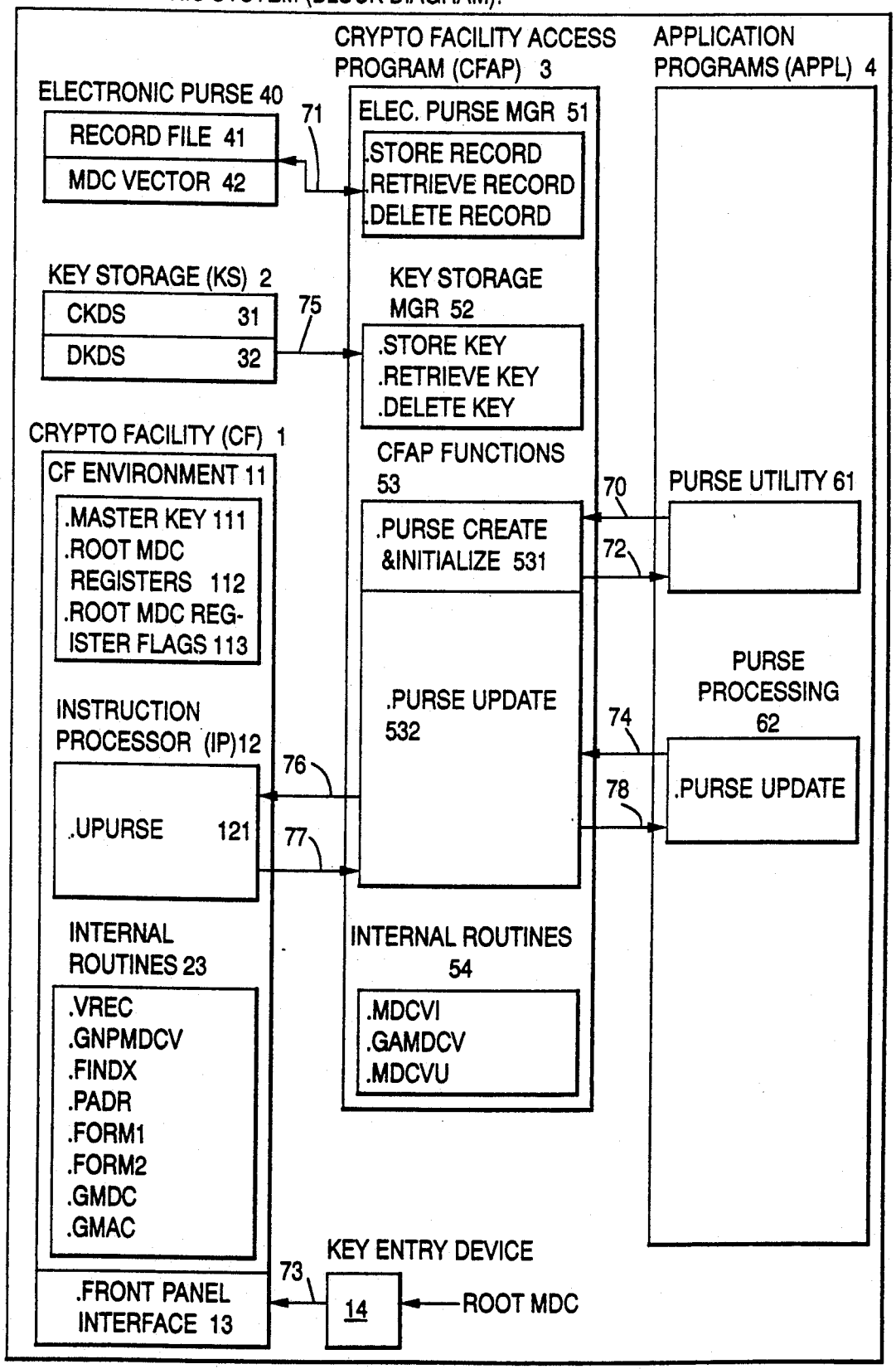
FIG. 10 illustrates a cryptographic system implementing an Update Purse (UPURSE) instruction.

FIG. 10 illustrates a cryptographic system implementing an Update Purse (UPURSE) instruction. The cryptographic system consists of a cryptographic facility (CF) 1 with a CF environment 11 for storage of cryptographic variables and an instruction processor 12 capable of executing a set of cryptographic instructions, a key storage (KS) 2, an electronic purse 40, a cryptographic facility access program (CFAP) 3, and using application programs (APPLs) 4. CF 1 contains a CF environment 11 for storage of cryptographic variables and an instruction processor 12 capable of executing a set of cryptographic instructions. Key storage 2 consists of a cryptographic key data set (CKDS) 31 for the storage of key-encrypting keys and a data key data set (DKDS) 32 for the storage of data-encrypting keys. Electronic purse 40 consists of a record file (RF) 41 containing a purse record for each member institution and an MDC vector (MDCV) 42 used in authenticating records in record file 41. CF environment 11 provides for the storage of a system master key (KM) 111, 64 root MDC registers 112, and 64 root MDC register flags 113. Keys stored in CKDS 31 and DKDS 32 are encrypted under master key 111. Root MDC 112 is used in the authentication process. A hand-held key-entry device 14, which attaches to front panel interface 13, permits cryptographic variables (e.g., the master key and the root MDC) to be manually loaded into CF 1. CFAP 3 contains an electronic purse manager 51, which stores, retrieves, and deletes records in electronic purse 40, and a key storage manager 52, which stores, retrieves, and deletes keys in key storage 2.

The steps in creating the electronic purse are traced as follows. Electronic purse 40 is created and initialized via a Purse Create and Initialize function 531 in response to a service request 70 initiated by Purse Utility 61. Purse Utility 61 is an program executing in application program space 4. Purse Create and Initialize function 531 creates purse records for each member institution, and produces an MDC vector, denoted MDCV, by invoking an MDC Vector Initialize (MDCVI) routine, described in detail in the section entitled "Routines." Electronic purse manager 51, on behalf of Purse Create and Initialize function 531, at 71, writes the created purse records in record file 41 and writes the created MDCV in MDC vector 42, both within electronic purse 40. The MDC Vector Initialize routine also produces a root MDC, which is provided to Purse Utility program 61 at 72. The root MDC is loaded into Root MDC storage 112 of the CF by entering it into key entry device 14, which attaches to front panel interface 13.

The steps in processing received transactions are traced as follows. A Purse Processing program 62 issues a Purse Update service request at 74, which has the following input and output parameters:

|  | Description |
|---|---|
| Inputs | |
| TMSG | A received transaction message. |
| MAC | A message authentication code produced by the originator on TSMG. |
| label | A DKDS label specifying the data key to be used to verify TSMG and MAC. |
| Outputs | |
| root-MDC | The root MDC associated with the produced MDC vector (MDCV). |

PURSE UPDATE function 532 performs the following actions. The transaction message (TMSG) is parsed to determine the identifiers, i and j, of the member accounts to be debited and credited, respectively. The identifiers i and j are used by electronic purse manager 51, at 71, to retrieve records Ri and Rj and the lengths of these records, Ri-length and Rj-length, from record file 41. Identifiers i and j are just the relative displacements of Ri and Rj in record file 41. (It is assumed that record file 41 contains t records.) Electronic purse manager 51 also retrieves MDC vector (MDCV) 42, i.e., the MDCV associated with record file 41. Label is used by key storage manager 52, at 75, to retrieve the encrypted data key KD, e*KM.C(KD), from DKDS 32. KD is encrypted with a variant key KM.C formed as the Exclusive-OR product of the master key KM and control vector C. Control vector C is a nonsecret cryptographic variable specifying the key usage attributes of KD. In this case, C specifies that KD may be used to verify message authentication codes, i.e., to verify the MAC generated on TMSG. A hash rule parameter is initialized, which specifies the hash algorithm originally used to construct MDCV. If only one hash algorithm is supported, then the hash rule parameter can be omitted. An index parameter is initialized, which specifies the root MDC storage location in the CF that contains the root MDC corresponding to MDC vector 42. If only one root MDC is supported, then the index parameter can be omitted. Parameter s is initialized with a value equal to the number of elements in MDCV. Identifier i and MDCV are specified as inputs to a Generate Authentication MDC Vector (GAMDCV) routine, which produces authentication MDC vector, AMDCVi, as an output. In like manner, identifier j and MDCV are specified as inputs to a GAMDCV routine, which produces authentication MDC vector, AMDCVj, as an output. The vectors AMDCVi and AMDCVj are required as inputs to an Update Purse instruction, described below.

Purse Update function 532 next invokes an Update Purse (UPURSE) instruction 121 at 76, which has the following input and output parameters:

|  | Description |
|---|---|
| Inputs | |
| index | Specifies the storage location in the CF of the Root MDC used in the authentication process. |
| hash-rule | Specifies the hash algorithm originally used to produce the MDC Vector, MDCV. |
| Ri-length | The length of record Ri in bytes. |
| Ri | Purse record of member institution i, which is debited. |
| Ri'-length | The length of record Ri' in bytes. |
| Ri' | Updated record Ri. |
| Rj-length | The length of record Rj in bytes. |
| Rj | Purse record of member institution j, which is credited. |
| Rj'-length | The length of record Rj' in bytes. |
| Rj' | Updated record Rj. |
| s | The number of elements in MDC vector, MDCV. |
| AMDCVi | An authentication MDC vector for record Ri with identifier i. |
| AMDCVj | An authentication MDC vector for record Rj with identifier j. |
| TMSG | A transaction message. |
| MAC | A message authentication code allegedly generated on TMSG with key KD. |
| e*KM.C(KD) | An encrypted key KD, where KD is a data key to be used to verify TMSG and MAC. |
| C | A 128-bit control vector with key usage attributes that enable KD to be used as a MAC verification key. |
| Outputs | |
| n | The number of elements in PMDCVi and PMDCVj. |
| PMDCVi | A path MDC vector for record Ri with identifier i. |
| PMDCVj | A path MDC vector for record Rj with identifier j. |
| CC | A condition code, as follows: |
|  | 00 - success |
|  | 16 - failure |

Algorithm Description:
1. Perform Consistency Checking:
    a. Verify that index is a value $0, 1, \ldots, 63$.
    b. Verify that Root-MDC register flag (index) = 'full'
    c. Verify that $s+1$ is a power of 2, find positive integer n such that $2^n - 1 = s$.
    d. Verify that $n - 2 > 0$.
    e. Perform FINDX(Ri→i) /* find index i */
    f. Perform FINDX(Rj→j) /* find index j */
    g. Verify that $2^{n-2} < i \leq 2^{n-1}$.
    h. Verify that $2^{n-2} < j \leq 2^{n-1}$.
    Continue if checking succeeds; otherwise set CC status flag and jump to step 8.
2. Consistency Checking on TMSG:
    a. Verify that value i in account number debited field of TMSG = value in financial institution account number field of purse record Ri.
    b. Verify that value j in account number credited field of TMSG = value in financial institution account number field of purse record Rj.
    c. Verify that value in amount field of TMSG ≤ value in account balance field of purse record Ri.
    d. Verify that value in transaction sequence number field of TMSG is one greater than value in transaction sequence number field of purse record Ri.
    e. Except for the transaction sequence number field and the account balance field, verify that Ri = Ri'.
    f. Verify that value in transaction sequence number field of Ri' is one greater than value in transaction sequence number field of Ri.
    g. Verify that value in account balance field of Ri less the value in amount field of TMSG equals value in account balance field of Ri'.

h. Except for the account balance field, verify that Rj=Rj'.
i. Verify that value in account balance field of Rj plus the value in amount field of TMSG equals value in account balance field of Rj'.

Continue if checking succeeds; otherwise set CC status flag and jump to step 8.

3. Authenticate TMSG and MAC using e*KM.C(KD):
   a. Invoke the GMAC internal routine, passing TMSG and e*KM.C(KD) as inputs, to produce an output message authentication code, denoted MAC'. Note that the GMAC internal routine processing is the same as the processing carried out by the GMAC instruction described in U.S. Pat. No. 4,918,728 "Data Cryptography Operations Using Control Vectors" by Matyas et al., cited under the background art.
   b. Verify that MAC' equals the value of MAC specified as an input to the UPURSE instruction. Continue if checking succeeds; otherwise set CC status flag and jump to step 8.
4. Authenticate Ri and Rj:
   a. Set root-mdc:=MDC stored in Root-MDC register(index).
   b. Perform VREC(root-mdc,i,Ri-length,Ri,hash-rule,n-1,AMDCVi→RC)
   c. Verify RC=0
   d. Perform VREC(root-mdc,j,Rj-length,Rj,hash-rule,n-1,AMDCVj→RC)
   e. Verify RC=0
5. Calculate PMDCVi:
   a. Perform GNPMDCV(hash-rule,i,Ri'-length,Ri',n,AMDCVi→PMDCVi)
6. Update AMDCVj using PMDCVi:
   a. Set i1:=$2^{n-1}+i-1$
   b. Set j1:=opposite($2^{n-1}+j-1$)
   c. If i1=j1 then do:
      1) Set AMDCVj(1):=PMDCVi(1)
      2) Jump to step 7. /* no more elements need to be updated */
   d. For k=2 to n-1 do:
      1) Set i1:=integer(i≧2)
      2) Set j1:=opposite(integer(j1≧2))
      3) If i1=j1 then do:
         a) Set AMDCVj(k):=PMDCVi(k)
         b) Jump to step 7. /* no more elements need to be updated */
7. Calculate PMDCVj:
   a. Perform GNPMDCV(hash-rule,j,Rj'-length,Rj',n,AMDCVj→PMDCVj)
8. Produce outputs: /* Note that PMDCVi must be processed before PMDCVj to update MDCV. Some old elements in PMDCVi may be overlaid by new elements in PMDCVj */

The output parameters returned by Update Purse instruction 121, at 77, consist of Path MDC Vector i, PMDCVi, corresponding to identifier i and Path MDC Vector j, PMDCVj, corresponding to identifier j.

Upon completion, the outputs of the UPURSE instruction are processed as follows. Updated records Ri' and Rj' are written by electronic purse manager 51, at 71, to record file 41. Purse Create and Initialize function 531 next invokes an MDC Vector Update (MDCVU) routine, specifying i, PMDCVi, s, and MDCV as inputs to produce an updated MDC vector, MDCV'. The MDC Vector Update routine is described in the section entitled "Routines." Purse Create and Initialize function 531 again invokes the MDCVU routine, specifying j, PMDCVj, s, and MDCV' as inputs to produce an updated MDC vector, MDCV". Finally, electronic purse manager 51 writes MDCV" to MDC Vector 42, at 71, thus completing the operation.

The reader will note that step 1 and steps 5 through 8 of the UPURSE instruction 121 are just the same as steps 1 through 6 of the URECS instruction described in the above section entitled CF Instructions. The UPURSE and URECS instructions differ mainly in the way instruction execution is authorized. For the URECS instruction, instruction execution is controlled using standard access control measures, e.g., on the basis of an enable/disable flag which is enabled on the basis of a secret password or a physical key-activated switch. For the UPURSE instruction, instruction execution is contingent upon successful verification of TMSG and MAC using KD. The MAC verification step is used as a means to control instruction execution; no secret password or physical key is needed to enable instruction execution. This is particularly advantageous, since now the system software has no need to control which applications and users have a right to execute the UPURSE instruction. In effect, the UPURSE instruction is a self-enabling instruction. That is, the instruction itself determines from information in the input records whether it is allowed to execute or not. The URECS instruction is not self-enabling. It must be enabled on the basis of an enable/disable flag which is set to the enabled position on the basis of an access control mechanism that checks the user or the application program to determine whether such execution should be granted. In the first case, execution is based on "what is to be performed" whereas, in the second case, execution is based on "who you are."

The purse update function 532 is implemented as a computer program with a sequence of instructions which are executed in the instruction processor 12 of the crypto facility 1. The flow diagram of FIG. 11 shows the sequence of operational steps performed by the computer program to carry out the purse update function 532. The flow diagram of FIG. 11 begins with Step 200, which begins the secure method for updating an electronic purse which includes a list of purse records. Step 202 defines an authentication tree with an authentication tree function comprising a one way function of purse records in the list, the authentication tree having a first root for a first list of the purse records and stores the first root in a cryptographic facility. The authentication tree includes authentication MDC vectors, one for each purse record in the list. Step 204 receives, in the cryptographic facility, a request for updating a given purse record in the first list of purse records using information contained in a given transaction record. Said request also includes an authentication code and a cryptographic key for authenticating said transaction record and a first authentication MDC vector for authenticating said purse record. Said authentication code can be a message authentication code when a symmetric key cryptographic algorithm is employed or a digital signature when an asymmetric key cryptographic algorithm is employed. Step 206 performs a purse update function in the cryptographic facility. This operation is performed in one, uninterrupted sequence in order to preclude the intervention of an unauthorized change to the data. The uninterrupted sequence of steps within step 206 are steps 208 through 218, which are described as follows. Step 208 authenticates the transaction record using the authentication code and cryptographic key. The authentication code may be a Message Authentication Code, in which case the cryptographic key is a secret key associated with a symmetric key algorithm such as the Data Encryption Algorithm. The secret key is encrypted under a master key stored within the cryptographic facility, and therefore must be decrypted under the master key before it can be used to authenticate the transaction record. In contrast, the authentication code may be a digital signature, in which case the cryptographic key is a public key associated with an asymmetric key algorithm. (Because the authentication code is produced either with a symmetric or asymmetric key algorithm, the authentication code is also called a representation of a digital signature.) If the transaction record authenticates properly, purse update function 532 continues; otherwise purse update function 532 terminates. Step 210 computes, with the existing purse record and the authentication MDC vector for the existing purse record specified at step 204, a first test path MDC vector and a first test root of the authentication tree for the first list by computing a path MDC vector of the authentication tree between the existing purse record and the first root. Step 212 compares the first test root with the first root for equality. If the root values are equal, purse update function 532 continues; otherwise purse update function 532 terminates. Step 214 updates the existing purse record with the transaction record, forming an updated purse record. Step 216 substitutes the updated purse record for the existing purse record in the first list, forming a second list. Step 218 computes with the updated purse record and the first authentication MDC vector, a second path MDC vector and a second root of the authentication tree for the second list by computing a path MDC vector of the authentication tree between the updated purse record and the first root and stores the second root in the cryptographic facility. In this manner, a new root of the authentication tree is efficiently computed for updated purse records. And before an existing purse record is updated, the root is used to check the existing purse record to insure that it has not been tampered with prior to updating.

Although a specific embodiment of the invention has been disclosed, it will be understood by those having skill in the art that changes can be made to that specific embodiment without departing from the spirit and the scope of the invention.

What is claimed is:

1. In a data processing system, a secure method for updating an electronic purse which includes a list of purse records, comprising the steps of:

defining in a data processing system an authentication tree with an authentication tree function comprising a one way function of purse records in the list, the authentication tree having a first root for a first list of said purse records and storing said first root in a cryptographic facility in said data processing system;

receiving a purse record signal in said data processing system from a list of purse records and receiving an MDC authentication vector signal in said data processing system for authenticating the purse record in said cryptographic facility;

receiving a transaction record signal receiving an authentication code signal and receiving a cryptographic key signal to authenticate the transaction record in said cryptographic facility, for updating an existing purse record in said first list;

performing a purse update function in said cryptographic facility, comprising the steps of:

authenticating in said data processing system, said transaction record, using said authentication code and cryptographic key;

computing in said data processing system, a first test authentication path and a first test root of the authentication tree for said first list by computing an authentication path of the authentication tree between said existing purse record and said first root;

comparing in said data processing system, said first test root with said first root;

updating in said data processing system, said existing purse record with said transaction record, forming an updated purse record;

substituting in said data processing system, said updated purse record for said existing purse record in said first list, forming a second list;

computing in said data processing system, a second authentication path and a second root of the authentication tree for said second list by computing an authentication path of the authentication tree between said updated purse record and said first root and storing said second root in said cryptographic facility; and outputting an updated purse record signal from said data processing system, representing said updated purse record.

2. A secure data processing system for updating an electronic purse which includes a list of purse records, comprising:

means for defining an authentication tree with an authentication tree function comprising a one way function of purse records in the list, the authentication tree having a first root for a first list of said purse records and storing said first root in a cryptographic facility;

said authentication tree including MDC authentication vectors, one for each purse record in said list;

means for receiving a purse record from a list of purse records and receiving an MDC authentication vector for authenticating the purse record in said cryptographic facility and further, for receiving a transaction record, receiving an authentication code and receiving a cryptographic key to authenticate the transaction record in said cryptographic facility, for updating an existing purse record in said first list;

means coupled to said defining means and to said receiving means, for performing a purse update function in said cryptographic facility, said performing means comprising;

means coupled to said receiving means, for authenticating said transaction record, using said authentication code and cryptographic key;

a root computing means coupled to said defining means and to said receiving means, for computing, with said existing purse record and a first MDC authentication vector for said existing purse record, a first test path MDC vector and a first test root of the authentication tree for said first list by computing a path MDC vector of the authentication tree between said existing purse record and said first root;

means coupled to said root computing means, for comparing said first test root with said first root;

means coupled to said input means, to said defining means and to said comparing means, for updating said existing purse record with said transaction record, forming an updated purse record;

means coupled to said updating means, for substituting said updated purse record for said existing purse record in said first list, forming a second list;

said root computing means computing with said updated purse record and said first MDC authentication vector, a second path MDC vector and a second root of the authentication tree for said second list by computing a path MDC vector of the authentication tree between said updated purse record and said first root and storing said second root in said cryptographic facility.

* * * * *